(12) United States Patent
Desai et al.

(10) Patent No.: US 12,397,714 B2
(45) Date of Patent: Aug. 26, 2025

(54) VEHICLE WITH COMPARTMENT AND DRAWER ACCESSIBLE FROM EXTERIOR OF VEHICLE

(71) Applicant: Rivian IP Holdings, LLC, Plymouth, MI (US)

(72) Inventors: Aditya Desai, Irvine, CA (US); Philip Samuel Tompkins, Irvine, CA (US); Darshan Satish Aher, Santa Ana, CA (US); Daniel Adam Beverley, Mission Viejo, CA (US)

(73) Assignee: Rivian IP Holdings, LLC

( * ) Notice: Subject to any disclaimer, the term of this patent is extended or adjusted under 35 U.S.C. 154(b) by 327 days.

(21) Appl. No.: 18/050,212

(22) Filed: Oct. 27, 2022

(65) Prior Publication Data

US 2023/0356662 A1    Nov. 9, 2023

Related U.S. Application Data

(60) Provisional application No. 63/339,957, filed on May 9, 2022.

(51) Int. Cl.
| | | |
|---|---|---|
| *B60R 5/04* | (2006.01) | |
| *B60J 5/04* | (2006.01) | |
| *B60R 7/02* | (2006.01) | |
| *B60R 11/06* | (2006.01) | |

(52) U.S. Cl.
CPC .............. *B60R 5/041* (2013.01); *B60J 5/0491* (2013.01); *B60R 7/02* (2013.01); *B60R 11/06* (2013.01)

(58) Field of Classification Search
CPC ........... B60R 5/041; B60R 11/06; B60R 7/04; B60R 7/08; B60R 5/00; B60R 7/02; B60J 5/0491

USPC .................................................. D6/705, 571
See application file for complete search history.

(56) References Cited

U.S. PATENT DOCUMENTS

| | | | | |
|---|---|---|---|---|
| 1,927,922 A | * | 9/1933 | Crum ...................... | B60R 9/065 296/37.2 |
| 2,455,417 A | * | 12/1948 | Holan .................... | B60R 11/06 D12/96 |
| 4,249,295 A | * | 2/1981 | Lance .................... | B60R 11/06 296/10 |
| 4,917,430 A | * | 4/1990 | Lawrence ................ | B60R 9/02 224/281 |
| 5,895,086 A | * | 4/1999 | Carico ................... | B60R 11/06 296/37.6 |

(Continued)

FOREIGN PATENT DOCUMENTS

FR    768133 A  *  7/1934  ............. B60R 11/06

OTHER PUBLICATIONS

Rivian Forums, "My Experience From First Mobile Service Appointment Apr. 6, 2022," retrieved from https://www.rivianforums.com/forum/threads/my-experience-from-first-mobile-service-appointment-4-6-2022.4553/ on May 11, 2022, 90 pages (2022).

(Continued)

*Primary Examiner* — Daniel J Colilla
(74) *Attorney, Agent, or Firm* — FOLEY & LARDNER LLP

(57) ABSTRACT

Disclosed are systems and methods for a vehicle. The vehicle can include a compartment. The vehicle can include an apparatus disposed within the compartment. The apparatus can include a drawer configured to open through transportation out of the compartment.

21 Claims, 32 Drawing Sheets

(56) References Cited

U.S. PATENT DOCUMENTS

| | | | | |
|---|---|---|---|---|
| 6,328,365 B1* | 12/2001 | Adsit | ................ | B60R 11/06 |
| | | | | 296/37.16 |
| 7,219,941 B1* | 5/2007 | San Paolo | ................ | B60R 9/00 |
| | | | | 224/404 |
| 2014/0139084 A1* | 5/2014 | Zehrer | ................ | B25H 3/02 |
| | | | | 312/317.1 |
| 2019/0061643 A1* | 2/2019 | Wilkie | ................ | B60R 11/06 |
| 2020/0062185 A1* | 2/2020 | Scaringe | ................ | B60J 5/0491 |
| 2020/0361360 A1* | 11/2020 | Parker | ................ | B60N 3/16 |

OTHER PUBLICATIONS

Rivian, "Rivian Camp Kitchen x Snow Peak Package," Rivian Gear Shop, retrieved from https://rivian.com/gear-shop/p/rivian-camp-kitchen-x-snow-peak on Oct. 12, 2022, 17 pages (2022).

\* cited by examiner

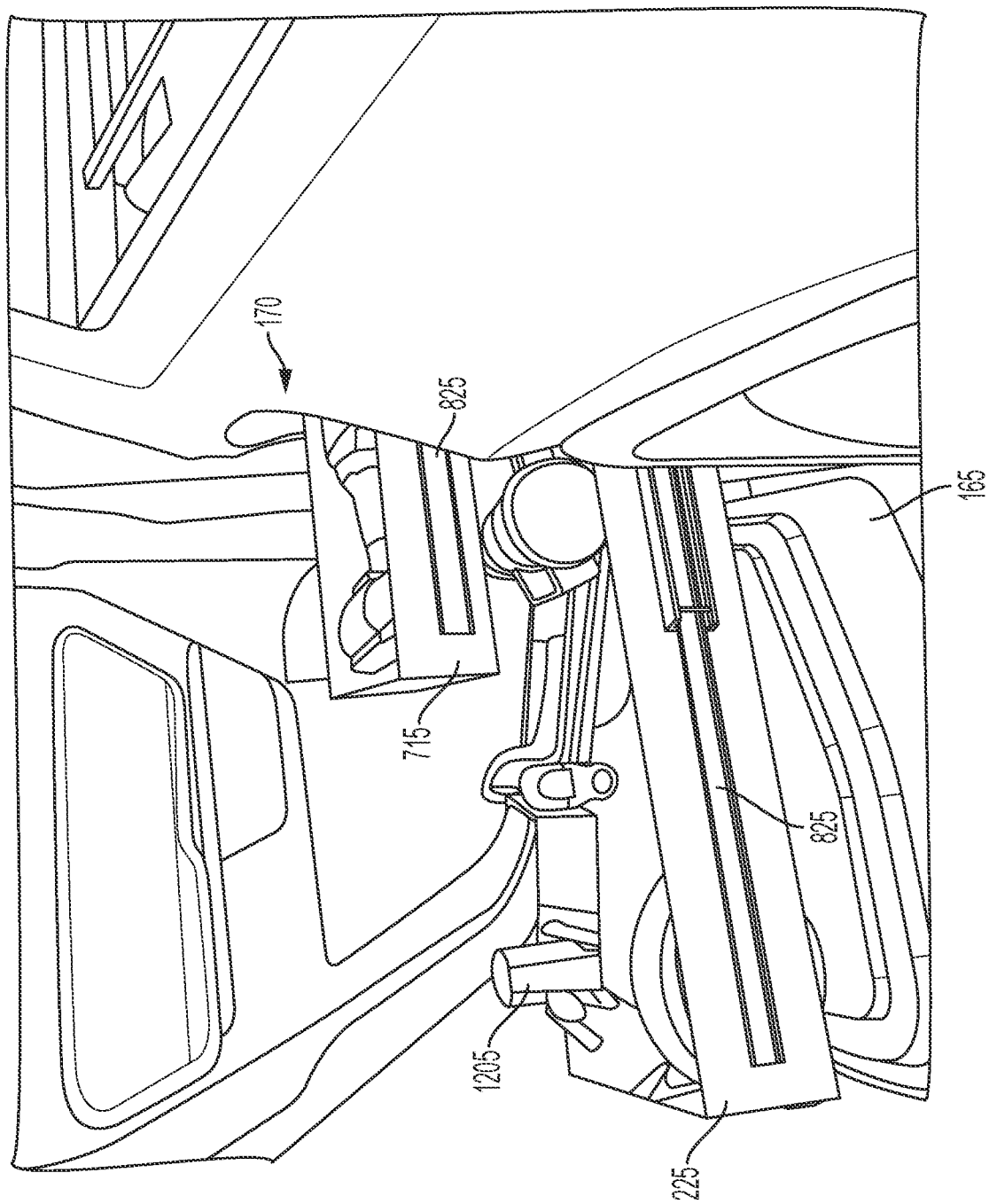

VEHICLE WITH COMPARTMENT AND DRAWER ACCESSIBLE FROM EXTERIOR OF VEHICLE

CROSS-REFERENCE TO RELATED PATENT APPLICATION

The present application claims the benefit of and priority to U.S. Provisional Patent Application No. 63/339,957 filed May 9, 2022, the disclosure of which is incorporated herein by reference in its entirety.

INTRODUCTION

A vehicle, such as an electric vehicle, can be powered by batteries. The vehicle can include components that operate the vehicle based on power provided by the batteries.

SUMMARY

This disclosure is generally directed to a vehicle that stores components. The vehicle can include a tunnel such as a gear tunnel. The gear tunnel can provide storage space for tools, equipment, recreational apparatuses, or vehicle parts. The gear tunnel can be or include a tunnel that extends from at least one side of the vehicle into the vehicle. At least one end of the gear tunnel can be covered by a door. The door can seal the gear tunnel preventing dirt, dust, wind, rain, snow, mud or other environmental conditions from entering the tunnel. The door can rotate on a hinge exposing an opening or the gear tunnel. The gear tunnel can extend through the vehicle from an opening on one side of the vehicle to an opening on another side of the vehicle. An apparatus, such as a drawer unit, can be disposed within the gear tunnel. The drawer unit can include at least one drawer. At least a portion of the drawer can extend out of the gear tunnel through the opening of the gear tunnel, exposing components stored in the drawer. The drawer can be retracted back into the gear tunnel through the opening of the gear tunnel. The drawer unit can provide efficient and organized storage of components in a vehicle.

At least one aspect is directed to a vehicle. The vehicle can include a compartment. The vehicle can include an apparatus disposed within the compartment. The apparatus can include a drawer configured to open through transportation out of the compartment.

At least one aspect is directed to a method. The method can include disposing a compartment in a vehicle. The method can include disposing an apparatus within the compartment. The apparatus can include a drawer. The method can include opening the drawer through transportation of the drawer out of the compartment.

At least one aspect is directed to an apparatus. The apparatus can include a portion disposed within a compartment of a vehicle. The apparatus can include a drawer connected to the portion and configured to open through transportation out of the compartment.

At least one aspect is directed to a vehicle. The vehicle can include an occupant seating area. The vehicle can include a tunnel, located between the occupant seating area and a rear portion of the vehicle, that extends from an opening on at least one side of the vehicle into the vehicle. The vehicle can include an apparatus disposed within the tunnel comprising a drawer to store a component. The apparatus can be configured to change a state of the drawer from a closed state in the tunnel to an open state through transportation of at least a portion of the drawer through the opening out of the tunnel.

At least one aspect is directed to a method. The method can include disposing a tunnel between an occupant seating area and a rear storage portion of a vehicle, the tunnel extends from an opening on at least one side of the vehicle into the vehicle. The method can include disposing an apparatus within the tunnel, the apparatus comprising a drawer to store a component. The method can include changing a state of the drawer, via the apparatus, from a closed state in the tunnel to an open state through transportation of at least a portion of the drawer through the opening out of the tunnel.

At least one aspect is directed to an apparatus. The apparatus can include a portion fixed to a bottom side of a tunnel disposed in a vehicle between an occupant seating area and a rear storage portion of the vehicle, the tunnel extends from an opening on at least one side of the vehicle into the vehicle. The apparatus can include a first drawer to store a first component in the tunnel. The apparatus can include a second drawer to store a second component in the tunnel. The apparatus can include a member that configured to change a state of the first drawer and the second drawer from a closed state in the tunnel to an open state through transportation of at least a portion of the first drawer and the second drawer through the opening out of the tunnel.

At least one aspect is directed to a vehicle. The vehicle can include a compartment located under a front hood of the vehicle. The compartment can include a first storage layer that stores a first component. The compartment can include a second storage layer stacked above the first storage layer that stores a second component.

At least one aspect is directed to a vehicle. The vehicle can include an interior. The interior can include a back wall. The interior can include a floor. The interior can include a surface fixed to the floor, at least one component supported by the surface. The interior can include a material comprising a first end attached to the back wall above the component and a second end attached to the floor in front of the component. A portion of the material can extend from the first end to the second end and secure the component to the flat surface.

At least one aspect is directed to a vehicle. The vehicle can include an interior. The interior can include a back wall. The interior can include a perforated sheet fixed to the back wall. The interior can include a component fixed to the perforated sheet via at least one hole of the perforated sheet.

At least one aspect is directed to a vehicle. The vehicle can include a seat. The seat can include a back portion and a headrest. The vehicle can include a cover. The cover can include a portion that surrounds a portion of the headrest that fixes the cover to the seat. The cover can include a bag that stores a component. The bag can be suspended over the back portion of the seat by the portion that surrounds the headrest.

At least one aspect is directed to a truck. The truck can include a truck bed. The truck bed can include a bottom surface. The truck bed can include a compartment to store a component located below the bottom surface. The truck bed can include a hinge fixed to a portion of the bottom surface to transport the portion of the bottom surface from a position that covers the compartment to a position that exposes the compartment.

At least one aspect is directed to a vehicle. The vehicle can include a tunnel that extends from an opening on at least one side of the vehicle into the vehicle. The vehicle can include a data processing system including one or more processors, coupled with memory. The data processing system can transmit a signal to at least one actuator of the vehicle to cause the at least one actuator to transport a door that covers the opening of the tunnel from a position covering the opening to a position exposing the opening and transport at least a portion of the drawer disposed within the tunnel out of the tunnel through the opening tunnel.

At least one aspect is directed to a system. The system can include a data processing system including one or more processors, coupled with memory. The data processing system can transmit a signal to at least one actuator of the vehicle to cause the at least one actuator to transport a door that covers an opening of a tunnel of a vehicle from a position covering the opening to a position exposing the opening and transport at least a portion of the drawer disposed within the tunnel out of the tunnel through the opening tunnel.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 13 depicts another example of a drawer unit installed in a gear tunnel on a driver side of the vehicle.

DETAILED DESCRIPTION

Figure 1:
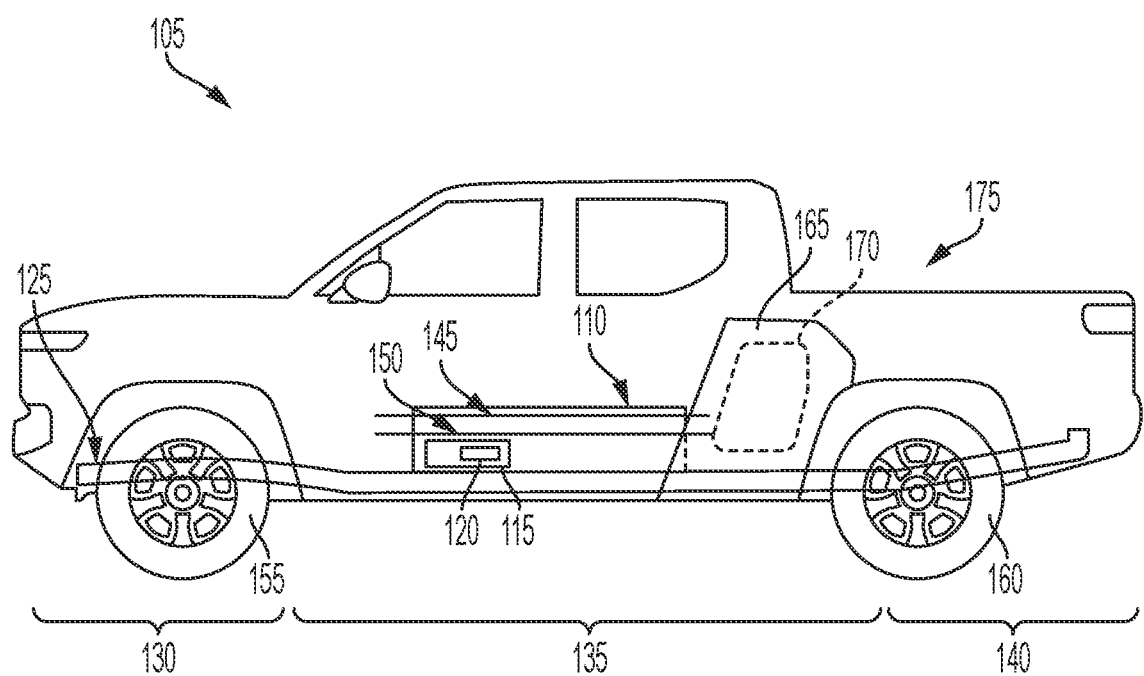
FIG. 1 depicts an example vehicle that includes the battery pack.

Following below are more detailed descriptions of various concepts related to, and implementations of, methods, apparatuses, and systems of vehicles having at least one gear tunnel. The various concepts introduced above and discussed in greater detail below may be implemented in any of numerous ways.

This disclosure is generally directed to a gear tunnel of a vehicle. A vehicle, such as a consumer vehicle, personal vehicle, recreational vehicle, or service vehicle, can carry equipment for servicing the vehicle itself or another vehicle. For example, a service vehicle can transport a service technician and equipment of the service technician to a vehicle that may need service. The vehicle needing service can be located in a garage, driveway, camping area, off-road environment, parking lot, on the side of a road, on the side of a trail. To perform service or maintenance on the vehicle, the service technician can transport tools, equipment, or vehicle parts in the service vehicle to a location where the vehicle that needs service is located. If the service technician is unable to transport all of the tools, equipment, or vehicle parts in the service vehicle, the service technician may need to make multiple trips between a garage and a vehicle to serviced. If the size of the service vehicle is increased to carry all of the tools, equipment, or vehicle parts, the service vehicle can consume larger amounts of electrical power, gas, or diesel. For an electric vehicle, this can result in fewer miles driven per charge. Furthermore, if the tools, equipment, or vehicle parts are unorganized in the service vehicle, the technician may spend additional time completing a service job.

To solve these and other technical problems, the technical solution described herein can include a vehicle including a gear tunnel. The gear tunnel can provide additional storage space for tools, service or recreational equipment, or vehicle parts. The gear tunnel can be or include a tunnel that extends from at least one side of the vehicle into the vehicle. The gear tunnel can extend through the vehicle from an opening on one side of the vehicle to an opening on another side of the vehicle. The gear tunnel also can have an opening on only one side of the vehicle, e.g., the driver side or the passenger side. An apparatus, such as a drawer unit, can be disposed within the gear tunnel. The drawer unit can include at least one drawer. The drawer unit can include at least one drawer that transports out of the gear tunnel through a first opening on a first side of the vehicle. Another drawer unit can include at least one drawer that transports out of the gear tunnel through a second opening of the gear tunnel on a second side of the vehicle. Tools, equipment, or vehicle parts can be stored and secured within the drawers. The drawer unit can provide efficient and organized storage of components for a service technician.

Furthermore, the vehicle can include a front trunk. For example, the vehicle can be an electric vehicle where a front area of the vehicle is free of vehicle components such as an engine. The front trunk can include at least one storage layer. The layers can be stackable layers. The layers can or include a shelf, tray, or flat portion to hold components for the service technician. The layers can be stacked within the front trunk to provide efficient and organized storage of equipment, tools, or vehicle components. The components located on each layer can be disposed at the layers based on the frequency at which the technician uses or retrieves the components. For example, components that the technician uses routinely can be located on the top level. Components that the technician uses less routinely can be located on a middle level. Components that the technician uses rarely can be located on a bottom level.

Furthermore, the vehicle can include a rear passenger storage area. The rear passenger storage area can be an area of the vehicle between a front driver or passenger seat and a back of a truck cab of the vehicle. The area can store components. For example, the area can include a rack. The rack can be a perforated board or a peg board. The rack can include pegs, clasps, or other connectors connected to holes or openings in the rack. Various tools, pieces of equipment, or replacement components can be mounted to the rack via the connectors and holes for efficient and organized storage. The rear passenger storage area can include a seat covering including a bag or bag set. The seat covering can be fixed to a driver seat or a passenger seat. For example, the seat covering can include an opening that can be placed over a headrest of the seat such that the covering is fixed to the seat. The covering can include a bag or set of bags that are suspended from a back side of the driver seat or passenger seat. The various bags can store tools, equipment, or vehicle components.

The vehicle can include a truck bed including a compartment such as a storage compartment. The storage compartment can be disposed within the truck bed under a top surface of the truck bed. The storage compartment can store equipment, tools, or vehicle components. For example, the storage compartment can store spare tires. At least a portion of the top surface can move between a position covering the compartment to a position exposing the compartment. For example, the portion of the top surface can hinge on a hinging apparatus from a horizontal position covering the compartment to a vertical position exposing the compartment. For example, a user or technician can press a button and the portion of the top surface of the truck bed can be actuated to expose the compartment so that the user or technician can access the components stored in the compartment.

FIG. 1 depicts an example cross-sectional of a vehicle 105 installed with at least one battery pack 110. The vehicle 105 can be an electric vehicle. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. The vehicle 105 can be a gas or diesel powered vehicle. The vehicle 105 can be fully or partially powered by gas or diesel. Electric vehicles 105 can be human operated or non-autonomous. Electric vehicles 105 such as electric trucks or automobiles can include on-board battery packs 110, battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the vehicle 105 to provide electrical power to various systems or components of the vehicle 105.

The vehicle 105 can include two front wheels 155 and two rear wheels 160. The vehicle 105 can include one or multiple motors. The motors can drive an axel connected to the two front wheels 155 or an axel connected to the two rear wheels 160. A single motor can drive an axel of the two front wheels 155. A single motor can drive an axel of the two rear wheels 160. Each wheel of the wheels 155 and 160 can be driven by an individual motor. For example, each of the four wheels 155 and 160 can be driven by one of four motors. The battery pack 110 can discharge stored energy to power the motors of the front wheels 155 and the rear wheels 160. The battery pack 110 can discharge stored energy to generate power that the motors receive. Operating the motors of the wheels 155 and 160 can cause the vehicle 105 to drive forward, reverse, or turn. The vehicle 105 can include the various storage compartments, e.g., a cargo bed 175 or at least one gear tunnel 170 covered by a door 165. The vehicles described herein can be service vehicles, mechanic vehicles, electric vehicles, electric service vehicles, trail vehicles, government vehicles, personal vehicles, commercial vehicles, company vehicles.

Figure 2A:
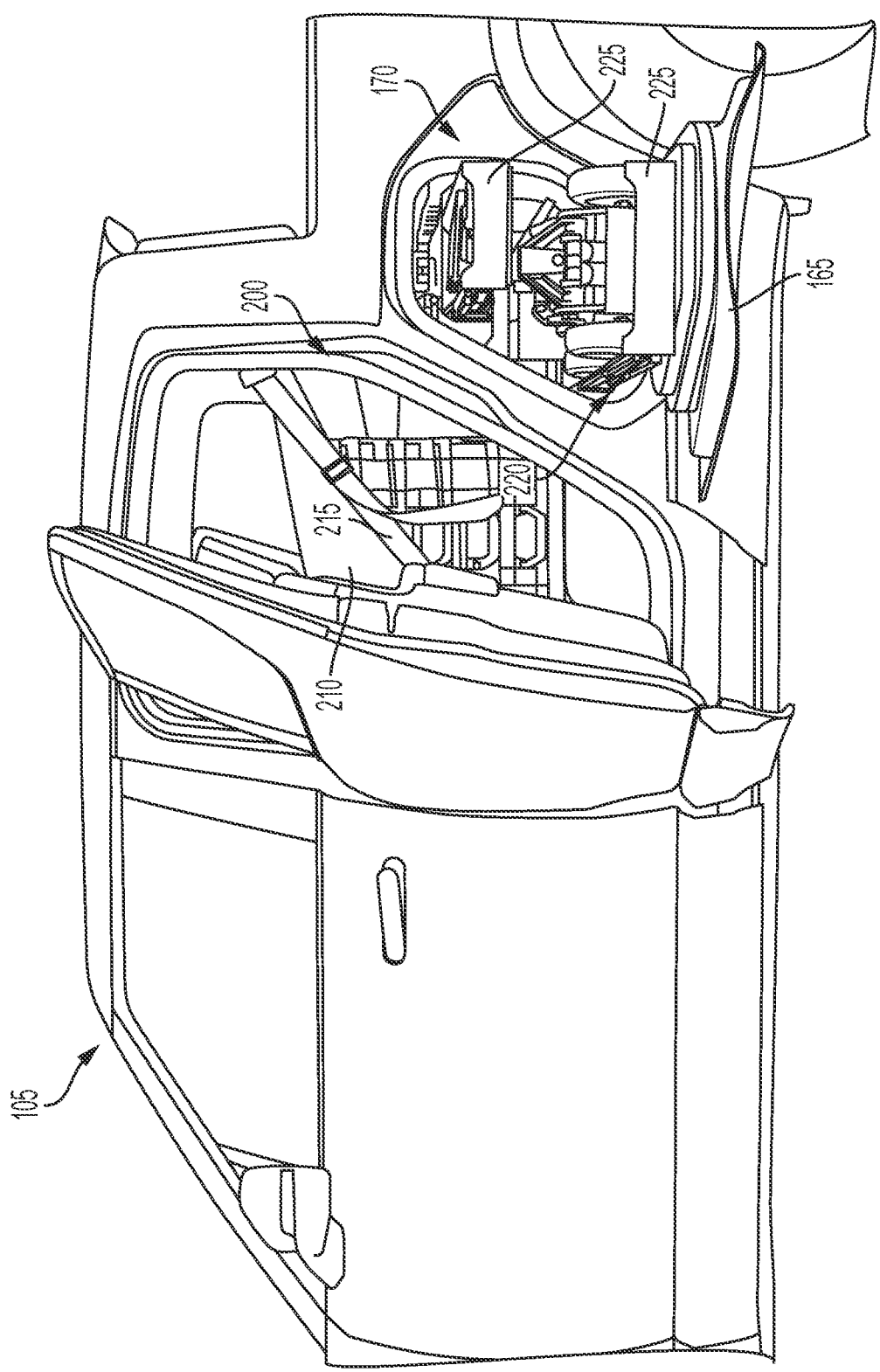
FIG. 2A depicts an example of a vehicle including a rear passenger storage area and a gear tunnel.

FIG. 2A depicts an example of the vehicle 105 including at least one rear passenger storage area 200 and at least one gear tunnel 170. The passenger storage area 200 or the gear tunnel 170 can store components. The components can be equipment, tools, camping supplies, entertainment devices, groceries, toys, beverages, coolers, folding chairs, sports equipment. The vehicle 105 can be a customer owned electric vehicle. The owner or other operator may wish to store equipment in the passenger storage area 200 of the gear tunnel 170. For example, the owner may wish to carry equipment to a job site, carry tools to fix their vehicle, or transport equipment. The vehicle 105 can be a service vehicle that is dispatched to provide service to another vehicle 105. For example, the vehicle 105 can be dispatched in response to a road-side assistance event. The vehicle 105 can be dispatched to perform maintenance on another vehicle 105 responsive to a customer or owner request.

When the vehicle 105 is dispatched, a technician driving the vehicle 105 can store equipment, e.g., tools, air pumps, tires, jacks, jack stands, air compressors, impact wrenches, wrench sets, socket sets, drills, pliers, hammers within the vehicle 105. For example, the equipment can be stored in the rear passenger storage area 200 or the gear tunnel 170. The rear passenger storage area 200 can include a cover 210 that holds the equipment to a base (e.g., a seat of the vehicle or other flat surface or sloped surface). The base can be fixed to a floor of the area 200, e.g., via bolts, nuts, screws, welding. The rear passenger storage area 200 can include at least one strap 215 that holds the cover down over the equipment. The cover 210 can have a flat portion on a top of the cover. The cover 210 can include at least one lateral side that extends down from the flat portion. The lateral sides can be triangular, rectangular, a free form shape, or any other form factor. The cover 210 can be a material that is fixed to the back wall of the cab and a floor of the cab. A first end of the cover 210 can be fixed to the back wall of the cab above the components. A second end of the cover 210 can be fixed to a floor, a front wall of the area 200, or at least one front seat in front of the components. A portion of the cover 210 that extends from the first end to the second end can secure the components, e.g., limit the movement of the components. The portion can be in physical contact with a top surface of the components and apply pressure to the components fixing the components to the surface and limiting the movement of the components.

The gear tunnel 170 can be or include an opening, compartment, chamber, or other area internal to the vehicle 105 that can store gear such as equipment or accessories for the vehicle or for use by the operator or passenger of the vehicle. The compartment 170 can be accessible to a user from an exterior of the vehicle 105. The compartment 170 can be accessible to a user in an interior of the vehicle 105. The compartment 170 can be located between an occupant seating area (e.g., a front seating area, a rear seating area, a passenger side seating area, a driver side seating area) and the rear portion 140 of the vehicle. The compartment 170 can be included under a front hood of the vehicle 105. The compartment 170 can be included within a rear trunk of the vehicle 105. The compartment 170 can be included within a truck bed of the vehicle 105. The gear tunnel 170 can include a central or longitudinal axis that extends from or through at least one opening of the into the vehicle 105 or though the gear tunnel 170. The gear tunnel 170 can include at least one drawer unit 220. The drawer unit 220 can be or include a unit, an apparatus, a system, or a device. The drawer unit 220 can include at least one drawer 225. The drawer unit 220 can include one, two, three, four, or any other number of drawers 225. The drawers 225 can ride on tracks that extend or retract. A user can open a door 165 of the vehicle 105 and extend or transport the drawers 225 via the drawer unit 220 to access equipment. The drawer unit 220 can open the drawers 225 of the drawer unit 220 through transporting the drawers between extended and stored positions along a central or longitudinal axis of the gear tunnel 170. The drawer unit 220 or the drawers 225 can be configured to open. The drawer unit 220 or the drawers 225 can be configured to open the drawers 225 through transportation of at least a portion of the drawers 225 out of the tunnel 170. For example, the drawers 225 can translate along the longitudinal axis out of the tunnel 170 through an opening of the tunnel 170 to open the drawers 225. At least a portion of the drawers 225 can extend through the opening of the tunnel 170 to open the drawers 225. Opening the drawers 225 can expose the contents of the drawers 225 to a user. For example, a user can pull on the drawers or a motor, piston, or hydraulic of the drawer unit 220 or vehicle 105 can extend or transport the drawers 225 (e.g., responsive to a user pressing a button). The user can retract the drawers 225 and close the door 165 to hold the equipment within the vehicle 105 when the user is driving.

The drawer unit 220 can be configured to change a state of at least one drawer 225 from a closed state to an open state. The drawer unit 220 can change the state of the drawers 225 via a user pulling on the drawers 225, a motor of the drawer unit 220 transporting the drawers 225, a spring or piston of the drawer unit 220 transporting the drawers 225. The drawers 225 can have a closed state where at least a portion of the drawers 225 is stored or located within the tunnel 170. For example, an entirety of the drawers 225 can be stored within the tunnel in the closed state. In the open state, at least a portion of the drawers 225 can extend out of the tunnel 170 through an opening of the tunnel 170. The drawer unit 220 can be configured to change the state of the drawers 225 from the closed state to the open state by transporting at least a portion of the drawers 225 out through the opening of the tunnel 170. The drawer unit 220 can be configured to change the state of the drawers 225 from the open state to the closed state by transporting at least a portion of the drawers 225 into the tunnel 170 through the opening of the tunnel 170. The drawer unit 220 can open the drawers 225 along the longitudinal axis of the tunnel 170 such that a user can access components stored within the drawers 225.

The gear tunnel 170 can extend across the vehicle 105. The gear tunnel 170 can include at least one top portion, at least one bottom portion, at least one first side portion, and at least one second side portion. The first side portion can extend up from a bottom portion to a top portion at an oblique angle to the bottom portion. The first side portion and the second side portion can be parallel (e.g., parallel and oblique to the bottom portion or parallel and perpendicular to the bottom portion). The first side portion and the second side portion can be slanted towards each other or away from each other. The first side portion can include an oblique sub-portion that extends from a bottom of the gear tunnel 170 and a perpendicular sub-portion that extends up to the top portion of the gear tunnel 170 from an end of the oblique sub-portion. The gear tunnel 170 can be disposed adjacent a cargo bed of the vehicle 105. The gear tunnel 170 can be disposed adjacent the rear passenger storage area 200. The gear tunnel 170 can be disposed between the cargo bed and the rear passenger storage area 200.

A first door 165 can cover a first end of the gear tunnel 170. A second door 165 can cover a second end of the gear tunnel 170. The doors 165 can move between open and closed positions sealing or exposing an interior of the gear tunnel 170. The doors 165 can hinge on a bottom side, a top side, or a lateral side of the opening. The doors 165 can be structured to support the drawers 225. For example, a bottom drawer 225 can extend out over the door 165 when the door 165 is in an open position. The bottom drawer 225 can rest upon a surface of the door 165. The surface of the door 165 can support the bottom drawer 225. The drawers 225 can extend out over the door 165 to provide access to the components within the drawers 225.

The gear tunnel 170 can include at least one bottom portion (e.g., a gear shuttle) that extends out from the gear tunnel 170. The bottom portion can be or include a sled or flat portion. The bottom portion can be supported by the vehicle 105. The bottom portion can be stored within the tunnel 170. The bottom portion can extend or transport out of the gear tunnel 170 through an opening of the gear tunnel 170. The bottom portion can be supported by at least one support. The support can include a leg, multiple legs, at least one pipe, wheel, or box. The drawers 225 or a drawer unit 220 can be fixed to the bottom portion and can extend out of, or retract into, or transport along with the bottom portion. The bottom portion can be 60-70 inches long. The bottom portion can be 55-75 inches long. The bottom portion can be less than 55 inches long. The bottom portion can be more than 75 inches long. The bottom portion can be 18-19 inches wide. The bottom portion can be 17-20 inches wide. The bottom portion can be less than 17 inches wide. The bottom portion can be more than 20 inches wide. The bottom portion can be 0.5-1.5 inches thick. The bottom portion can be 0.2-2 inches thick. The bottom portion can be more than 2 inches thick. The bottom portion can be less than 0.2 inches thick. The bottom portion can include a top portion, a bottom portion, at least one lateral wall, and at least one end. The bottom portion can be a rectangular solid or a prismatic shape.

The rails that the drawers extend on can be mounted to an apparatus such as a frame or drawer unit 220 that sits inside the gear tunnel 170 and attaches to the same or different mount locations as a gear tunnel shuttle mounts to. The drawers 225 or drawer unit 220 can mount at the top of the gear tunnel 170 intended to hold some trim components in place to help support the frame. The gear tunnel 170 can include three drawers 225. The drawers 225 can extend from a side of the vehicle 105. Each drawer can have the same depth or different depths. For example, the bottom drawer 225 can be the longest drawer. The middle drawer 225 can be the second longest drawer. The top drawer 220 can be the shortest drawer.

The drawer unit 220 can mount onto the shuttle. A portion, or an entirety of the drawer unit 220, can travel out of the gear tunnel 170 on the shuttle. At least one drawer 225 can extend, move, or transport out from the drawer unit over the shuttle, out of the tunnel 170, and over the door 165. The door 165 can rotate on an apparatus, e.g., a hinge between an open position exposing the opening of the gear tunnel 170 to a closed position covering the opening of the gear tunnel 170. The hinge can be fastened to a bottom side of the door 165 and to the vehicle 105. The hinge can rotate a top side of the door 165 downwards towards a surface under the vehicle 105. When in the open position, the door 165 may be parallel to a floor of the vehicle 105 or perpendicular to a side of the vehicle 105. Components, such as the drawer unit 220 or drawers 225 of the drawer unit 220, can extend out of the tunnel 170 over the door 165 when the door 165 is opened. For example, the drawers 225 can rest upon a top surface of the door 165 when the door 165 is opened. The door 165 in the open position can support the weight of the drawer unit 220, the drawers 225, or objects stored within the drawers 225. The door 165 can support a maximum of 290-310 pounds of weight. The door 165 can support a maximum of 280-320 pounds of weight. The door 165 can support a maximum weight less than 280 pounds. The door 165 can support a maximum weight more than 320 pounds.

Figure 2B:
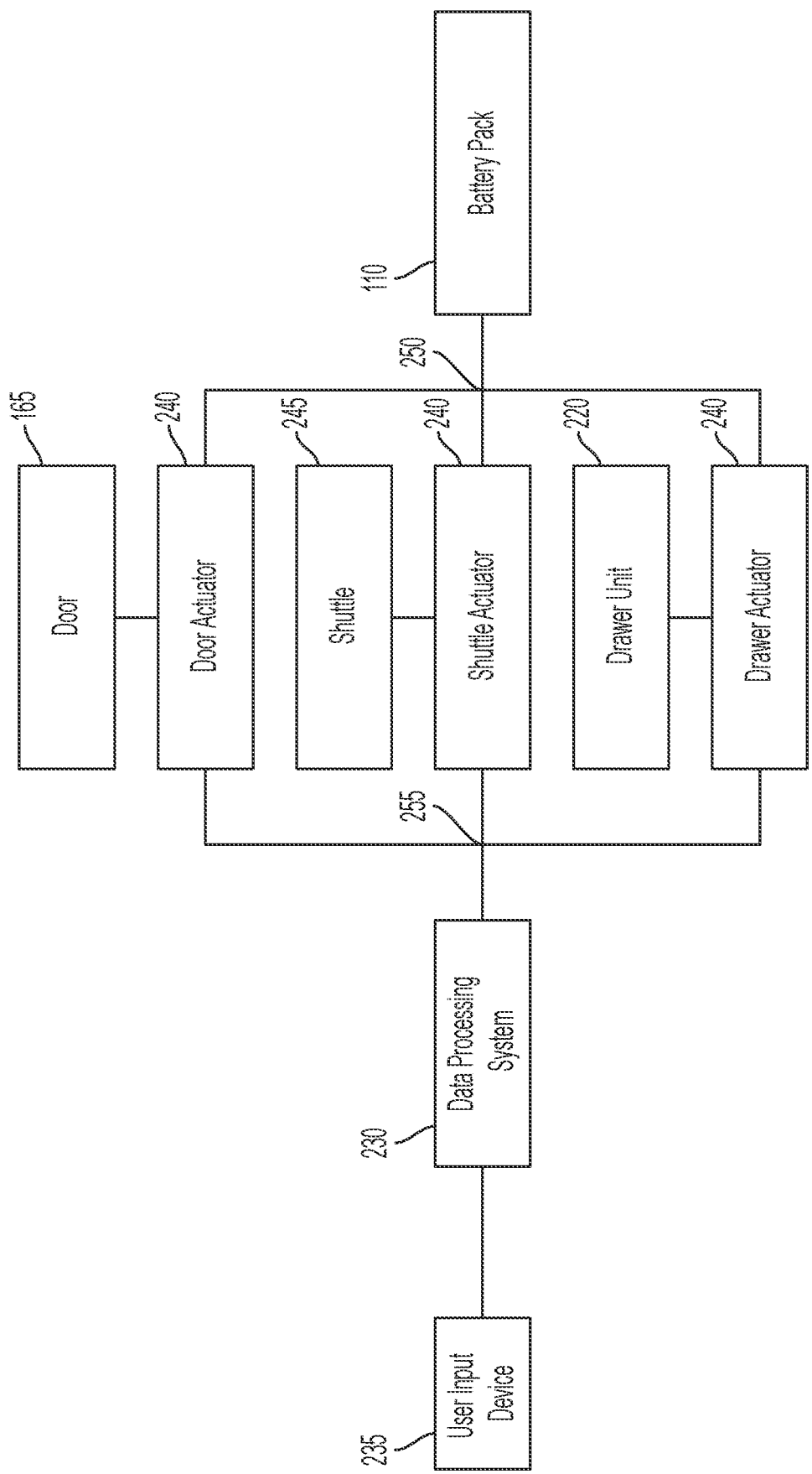
FIG. 2B depicts an example data processing system that controls a gear tunnel of a vehicle.

FIG. 2B depicts an example data processing system 230 that controls the gear tunnel 170 of the vehicle 105. The data processing system 230 can be a component of the vehicle 105, e.g., included as part of an infotainment system and can be located in the vehicle 105. The data processing system 230 can be located outside the vehicle 105 and communicate with computing systems of the vehicle 105. The data processing system 230 can be a cloud-based system, a server system, a smartphone, a laptop computer, a desktop computer. The data processing system 230 can connect with at least one actuator 240 of the vehicle 105. The actuators 240 can include a door actuator 240 to open or close the door 165. The actuators 240 can include a shuttle actuator 240 to transport a shuttle 245, such as a sled or flat portion, into or out of the gear tunnel 170. The actuators 240 can include a drawer actuator 240 to actuate a drawer unit 220, e.g., transport at least a portion of a drawer 225 of the drawer unit 220 into or out of the gear tunnel 170.

The actuators 240 can include various motors, electrically actuated locking assemblies, electrically actuated spring or piston assemblies, solenoids, or other components. The data processing system 230 can provide signals to the actuators 240 via electrical connections 255. The electrical connections 255 can be electrical wires, electrical traces, electrical connectors. The data processing system 230 can communicate with at least one data processing system of the actuators 240 via a communication protocol such as a controller area network (CAN), a wireless network such as a Wi-Fi network, a serial communication protocol, a Bluetooth network, a cellular network.

The actuators 240 can be powered via power received from the battery pack 110. The battery pack 110 can provide power to the actuators 240 via electrical connections 250. The electrical connections 250 can convey power from the battery pack 110 to the actuators 240. The electrical connections 250 can include busbars, power distribution boxes, high-voltage distribution boxes, electrical connections, wires, cables. At least one component of the vehicle 105 can prepare power for the actuators 240. The components can transform power from alternating current (AC) power to direct current (DC) power, convert power from DC power to AC power, adjust voltage levels. The actuators 240 can be powered by the battery pack 110 and actuate responsive to receiving a signal from the data processing system 230.

The data processing system 230 can receive a signal and deploy or retract the drawer unit 220 or the drawers 225 responsive to receiving the signal. The signal can be received from at least one user input device 235. For example, a console of the vehicle 105 can include one or more touch-screens, buttons, keyboards, microphones for voice control. A user can provide an input via the console to cause the data processing system 230 to deploy the drawer unit 220 or the drawers 225. The signal can be received from an access control device of the vehicle 105, e.g., a key or dongle. A user can press a button on the access control device causing the access control device to send the signal to the data processing system 230 via at least one wired or wireless communications protocol. A user can send the signal to the data processing system 230 from a smartphone running an application, a laptop, a desktop computer, a voice assistant, or another personal device. The user input device 235 can receive a user input via a touch screen, a microphone, a keyboard, a mouse, or any other input device. The user input device 235 can send the signal to the data processing system 230 via a wired or wireless communications protocol responsive to receiving the user input.

Responsive to receiving a signal to deploy the drawer unit 220 or the drawers 225, the data processing system 230 can cause at least one door 165 to be actuated from a closed position to an open position by communicating a signal to the door actuator 240 causing the door actuator 240 to actuate the door 165. The data processing system 230 can cause the door 165 to be unlocked and to move between the closed position and the open position. The data processing system 230 can cause the drawer unit 220 or the drawer 225 to extend from a position within the tunnel 170 to a position extended out of the tunnel 170 by communicating a signal to the drawer actuator 240 causing the drawer unit 220 or the drawer 225 to transport out of the tunnel 170.

The data processing system 230 can cause a shuttle 245 to extend from a position within the tunnel 170 to a position extended out of the tunnel 170 by communicating a signal to the shuttle actuator 240 causing the shuttle actuator 240 to actuate the shuttle 245. The drawer unit 220 or the drawer 225 can be fixed top a top surface of the shuttle 245 can extend out of the tunnel 170 along with the shuttle. The data processing system 230 can cause a support to extend from a storage location along a bottom side of the shuttle to a deployed position resting on a surface outside the vehicle 105 (e.g., pavement, a trail, gravel, dirt, concrete). Responsive to receiving a signal to retract the drawer unit 220 or the drawers 225, the data processing system 230 can cause the support to retract to the storage location by communicating a signal to the shuttle actuator 240. The data processing system 230 can cause the shuttle 245 to retract back into the tunnel 170. The data processing system 230 can cause the door 165 to move from the open position to the closed position. The data processing system 230 can cause the door 165 to lock by communicating a signal to the door actuator 240 causing the door actuator 240 to lock the door 165.

Figure 3:
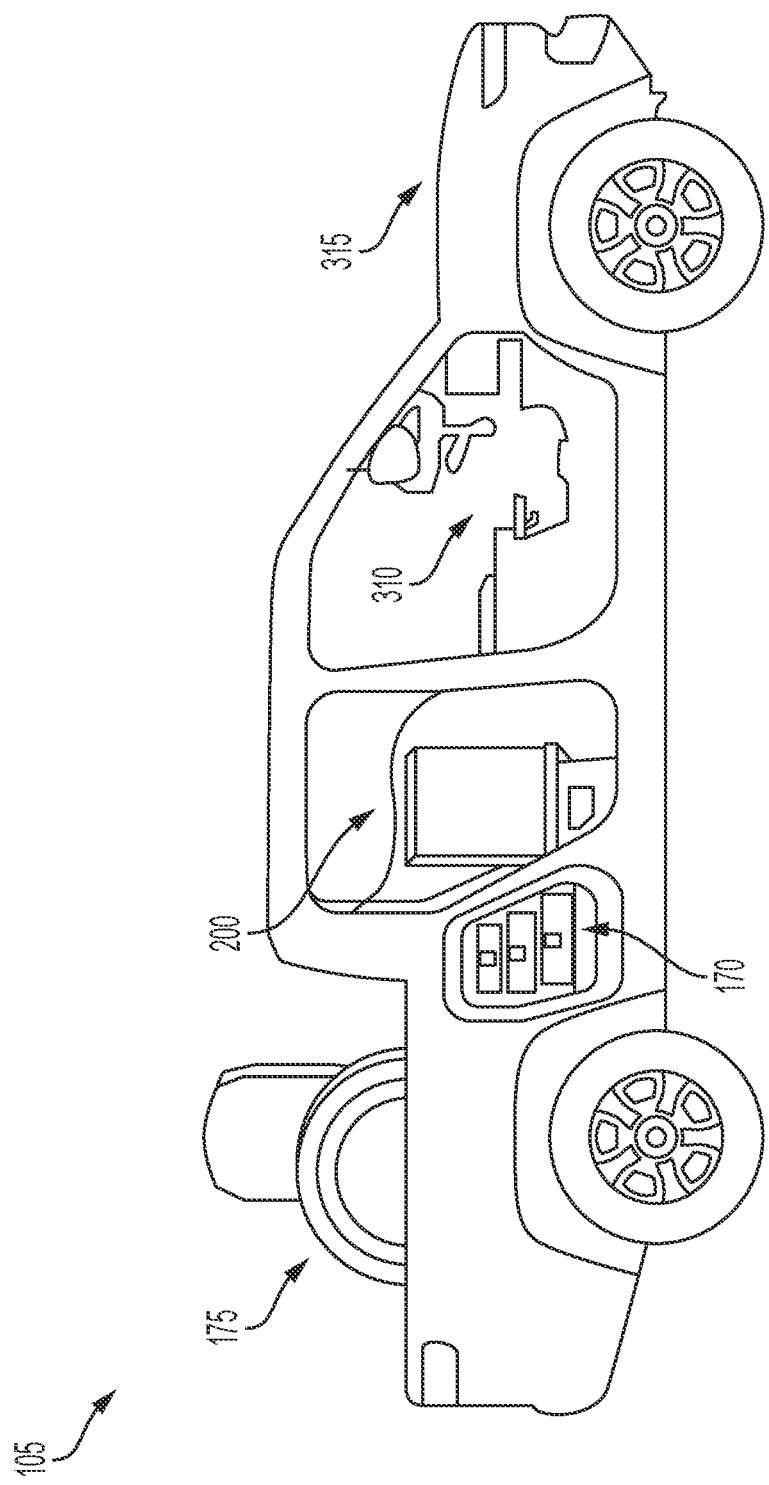
FIG. 3 depicts an example vehicle including a cargo bed, a gear tunnel, a rear passenger storage area, a center console storage area, and a front trunk storage area.

FIG. 3 depicts an example of the vehicle 105 including at least one cargo bed 175, the gear tunnel 170, the rear passenger storage area 200, at least one center console storage area, and at least one front trunk storage area 315. The cargo bed 175 can store equipment such as tires (e.g., spare tires). The cargo bed 175 can include a storage compartment under a floor of the cargo bed for storing equipment (e.g., spare tires). The center console storage area 310 can include at least one box, enclosure, tray, or compartment that stores equipment (e.g., air compressors, flash lights, medical kits, or vehicle documents). The front trunk storage area 315 can be a single or multi-layer storage compartment. The front trunk storage area 315 can include multiple stackable layers that store components.

Figure 4:
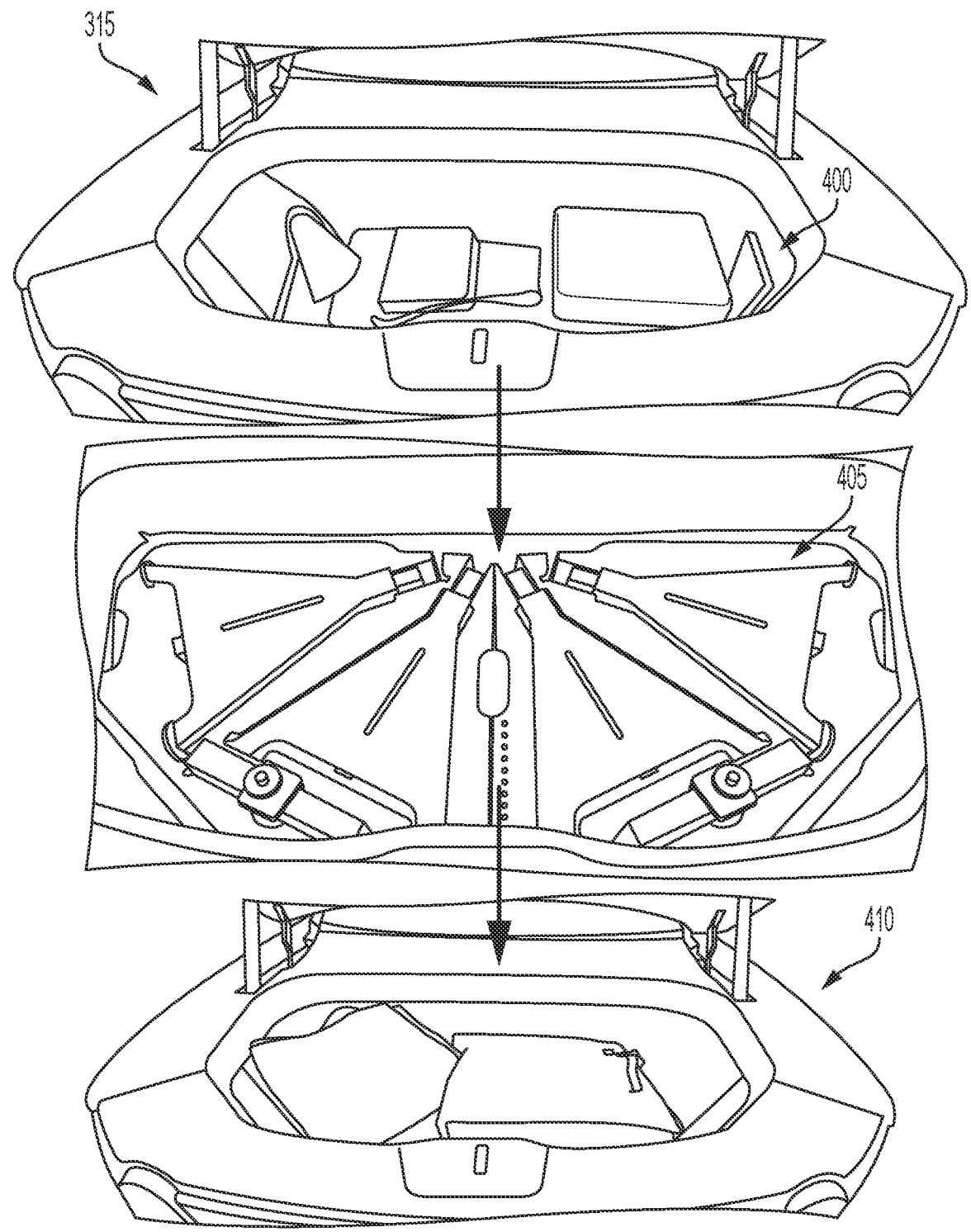
FIG. 4 depicts an example of a front trunk storage area of a vehicle.
Figure 5A:
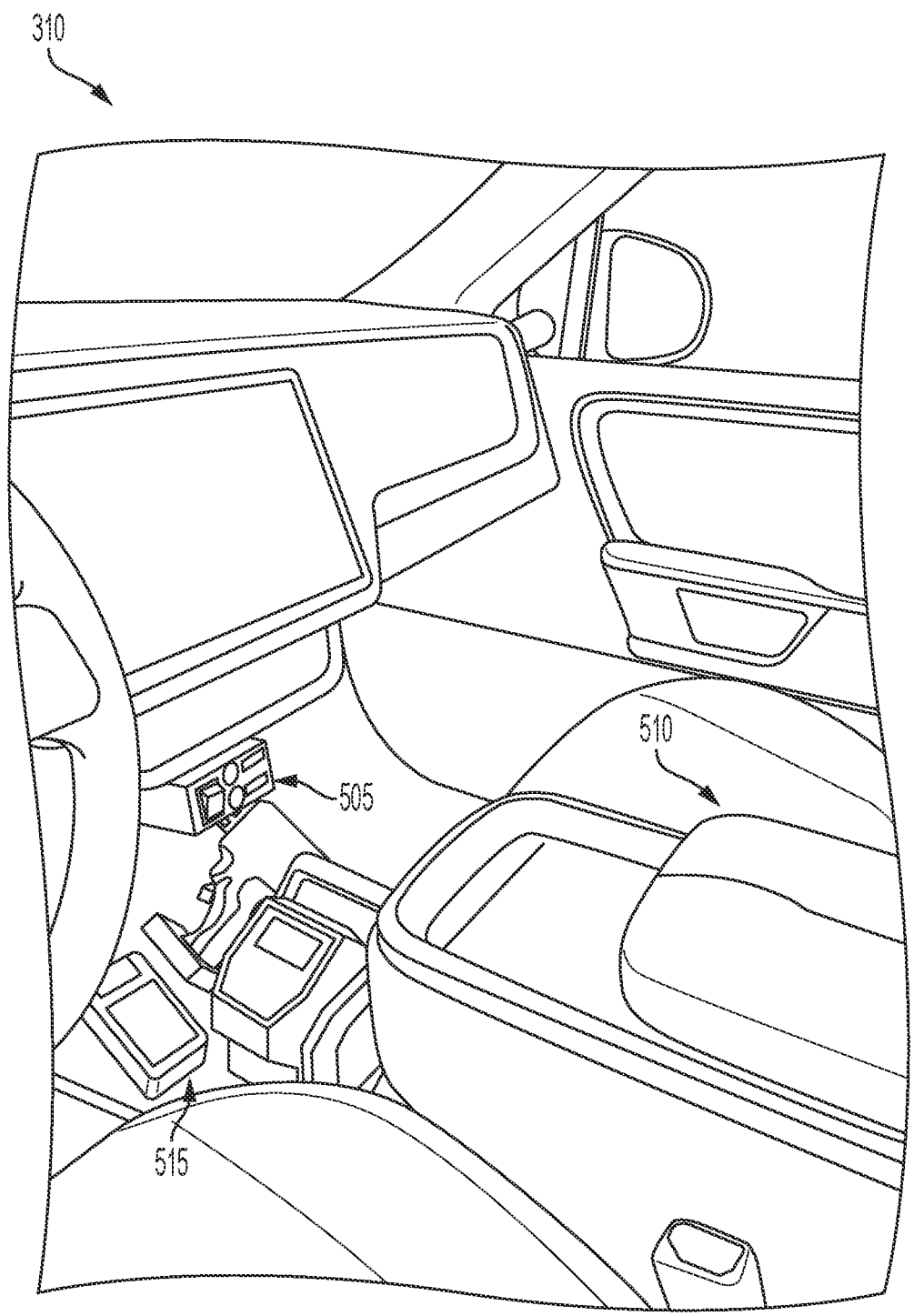
FIG. 5A depicts an example of the center console storage area.
Figure 5B:
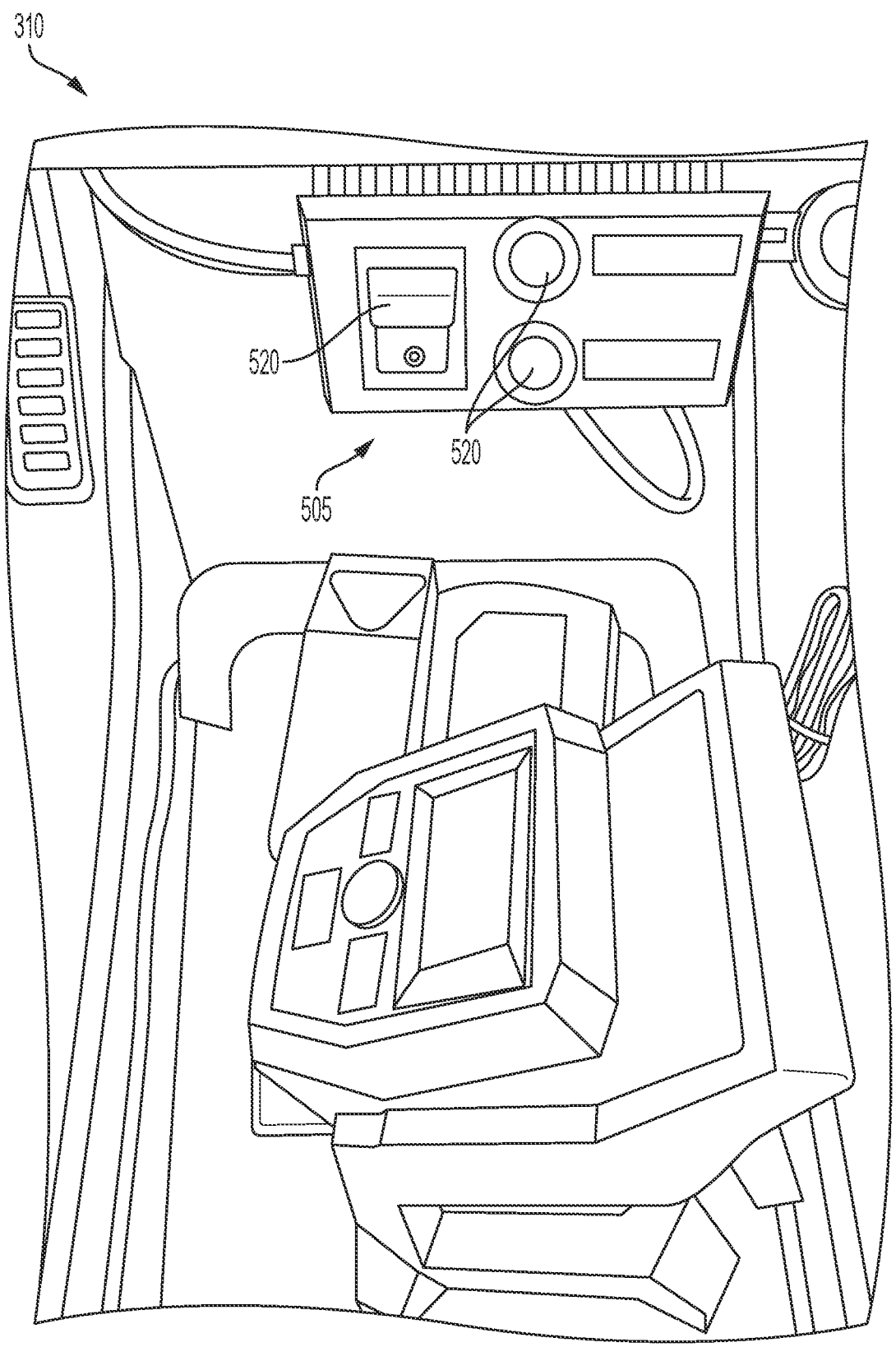
FIG. 5B depicts an example panel of a center console storage area of a vehicle that controls at least one light of the vehicle.
Figure 5C:
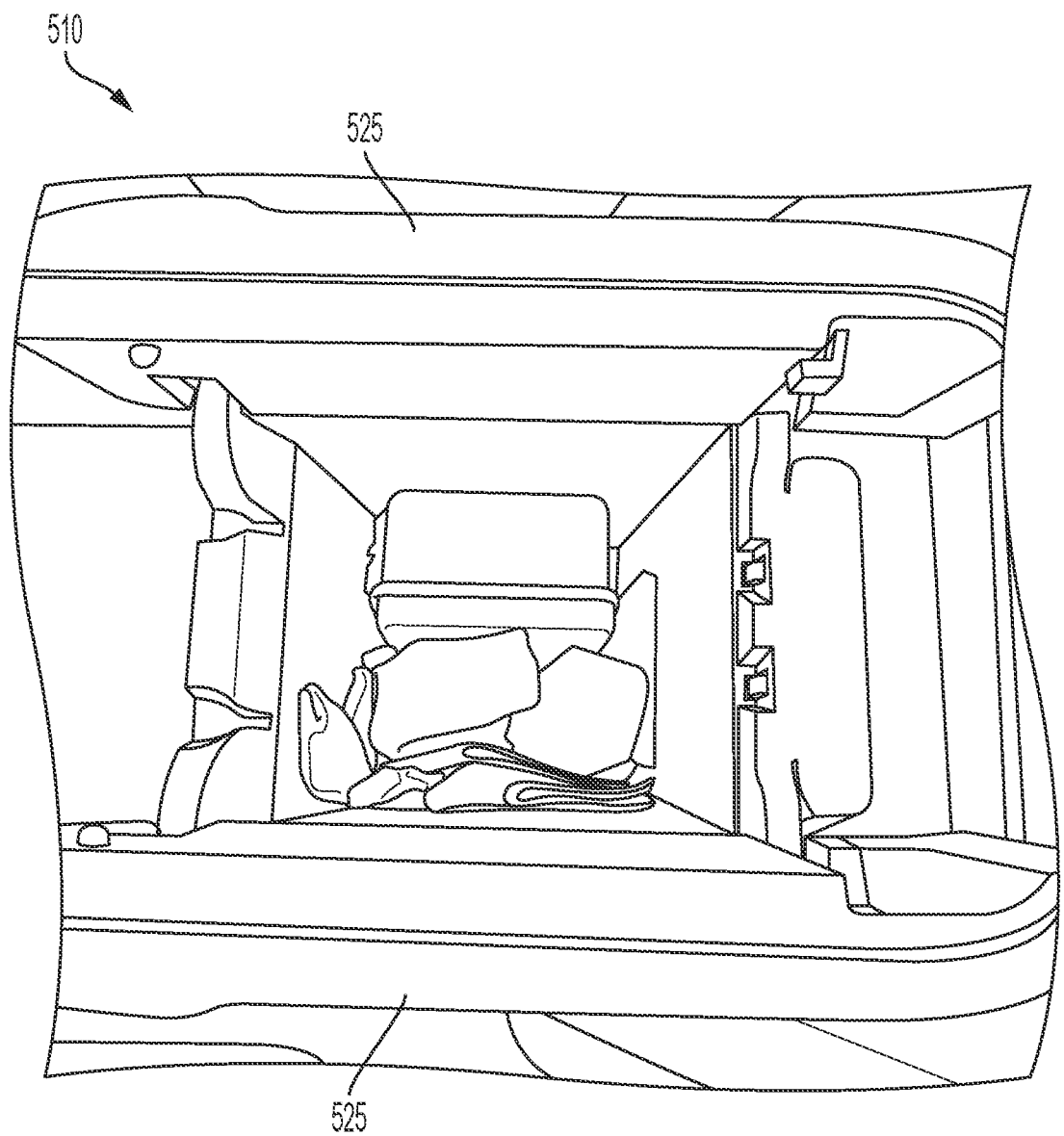
FIG. 5C depicts an example storage compartment of a center console storage area of a vehicle.
Figure 5D:
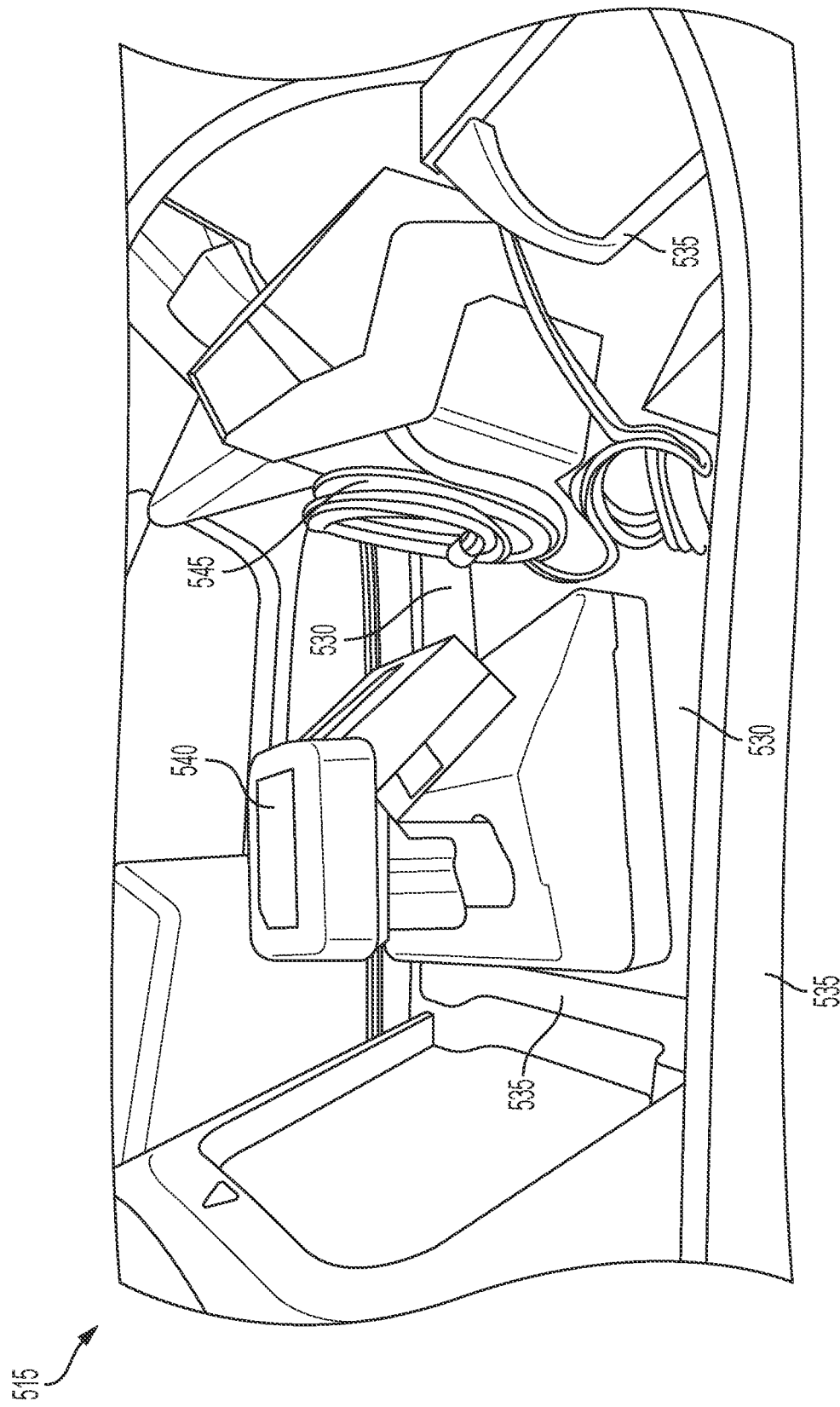
FIG. 5D depicts an example storage tray of a center console storage area of a vehicle.

FIG. 4 depicts an example of the front trunk storage area 315. The front trunk storage area 315 includes a bottom layer 400. The bottom layer 400 can store equipment that a driver does not want to access often. The bottom layer 400 can be a container, compartment, or box that includes a bottom, and at least one side. The bottom layer 400 can be a bottom surface of a compartment covered by a hood of the vehicle 105. The hood of the vehicle 105 can transport, via at least one hinge, from a position covering the compartment to a position exposing the compartment. The compartment can include a bottom and one, two, three, or four lateral walls that form the compartment and extend up from the bottom to an opening of the compartment.

The front trunk storage area 315 can include at least one middle layer 405. The middle layer 405 can be or include a tray that sits upon or above the bottom layer 400. The tray can be supported by a connector on the side of the front trunk storage area 315. The middle layer 405 can store vehicle jacks for supporting the weight of a vehicle off the ground. The middle layer 405 can be or include foam with cut outs in the shape of the jacks. The jacks can be inserted into the cut out areas of the foam and fixed within the foam by pressure from the foam. The front trunk storage area 315 can include a top layer 410. The top layer 410 can be or include a tray that sits upon or above the middle layer 405. The top layer 410 can or include a top surface of the middle layer 405. For example, a top surface of a foam cut out or a top surface of the jack stands can form a surface for components to be placed upon. The top layer 410 can be supported by a connector on the side of the front trunk storage area 315. The top layer 410 can store a blanket, a spill kit, knee pads, or other components, for example.

FIGS. 5A-5D depict an example of the center console storage area 310. The center console storage area 310 includes a panel 505. The panel 505 can include at least one input device 520 (e.g., a screen, a button, or switch). A user can provide input via the input device 520. The input device 520 can turn on or off at least one strobe of the vehicle. The input device 520 can turn on or off a front strobe of the vehicle, e.g., at least one light 1405. The input device 520 can turn on or off a rear strobe of the vehicle, e.g., at least one light 1805. The input device 520 can set a color of the strobes, e.g., white, yellow, orange. The input device 520 can set the strobes to be constantly on, blink, ramp up or down in brightness. For example, a user can set, via the input device 520, the strobes to be blinking yellow lights to indicate that the vehicle 105 is a service vehicle.

The center console storage area 310 includes at least one compartment 510. The compartment 510 can be or include an enclosure. The compartment 510 can include at least one top portion 525. The top portion 525 can open so that a user can store or retrieve components from the compartment 510. The top portion can slide, hinge, collapse, or fold. One side of the top portion 525 can hinge on one side of an opening of the storage area 310 and another side of the top portion 525 can hinge on another side of the opening of the storage area 310. The compartment 510 can store registration documents, insurance documents, yellow vests, first aid supplies. The center console storage area 310 includes at least one tray 515. The tray 515 can include a bottom and one or more lateral sides. The tray 515 can store first aid equipment, battery chargers, tire inflators, or other equipment. The tray 515 can include a flat or sloped surface 530. The tray 515 can include at least one lateral wall 535 that can extend up from a surface 530 to an opening of the tray 515. The center console storage area 310 can include power connections. The power connections can provide AC or DC power from a battery pack 110. For example, a charger 540 for charging tools for drills, flashlights, impact wrenches or other motor operated tools can charge through the power connections. Furthermore, an air compressor 545 for filling air in tires can charge or be powered based on the power connections.

Figure 6A:
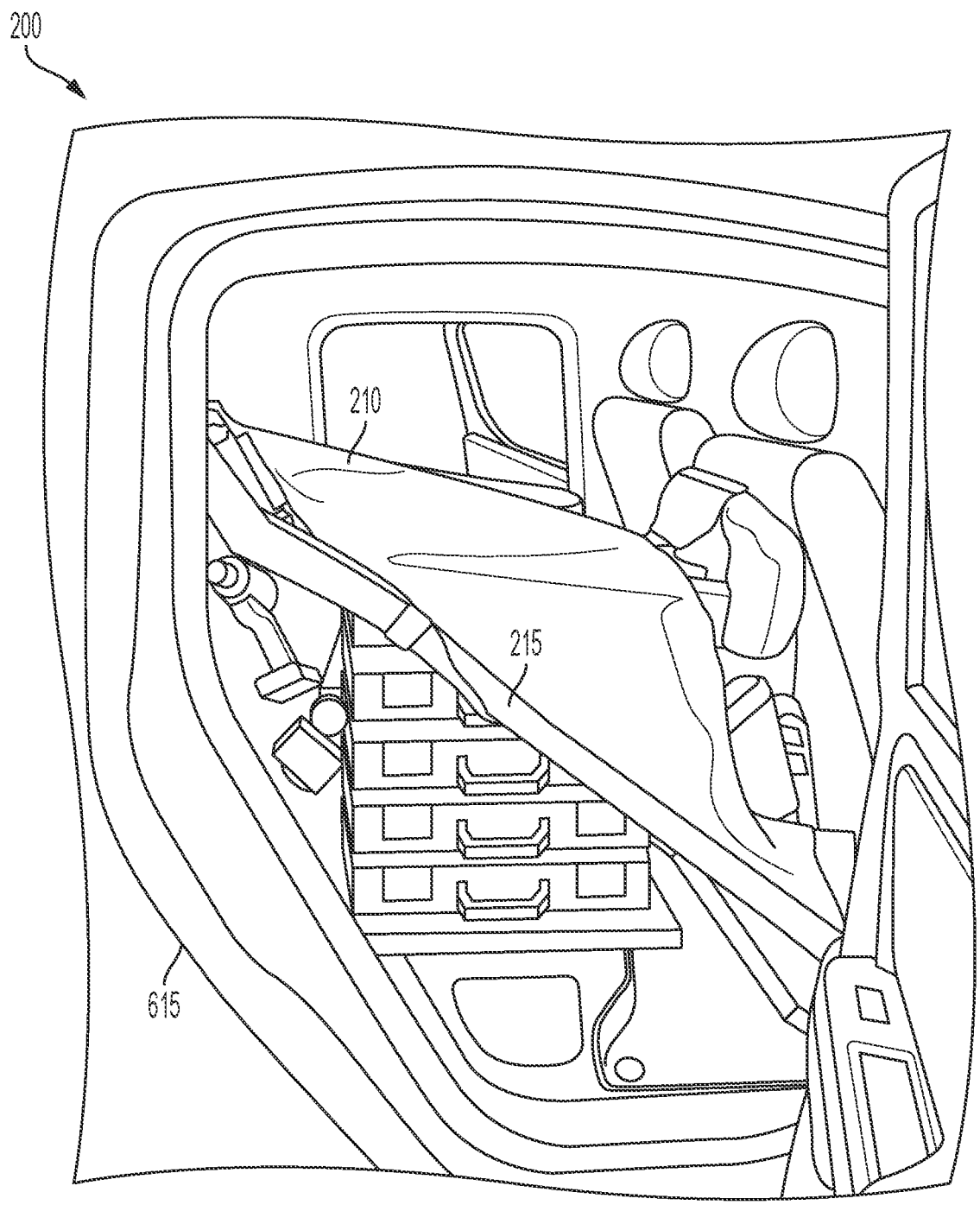
FIG. 6A depicts an example rear passenger storage area of a vehicle.
Figure 6B:
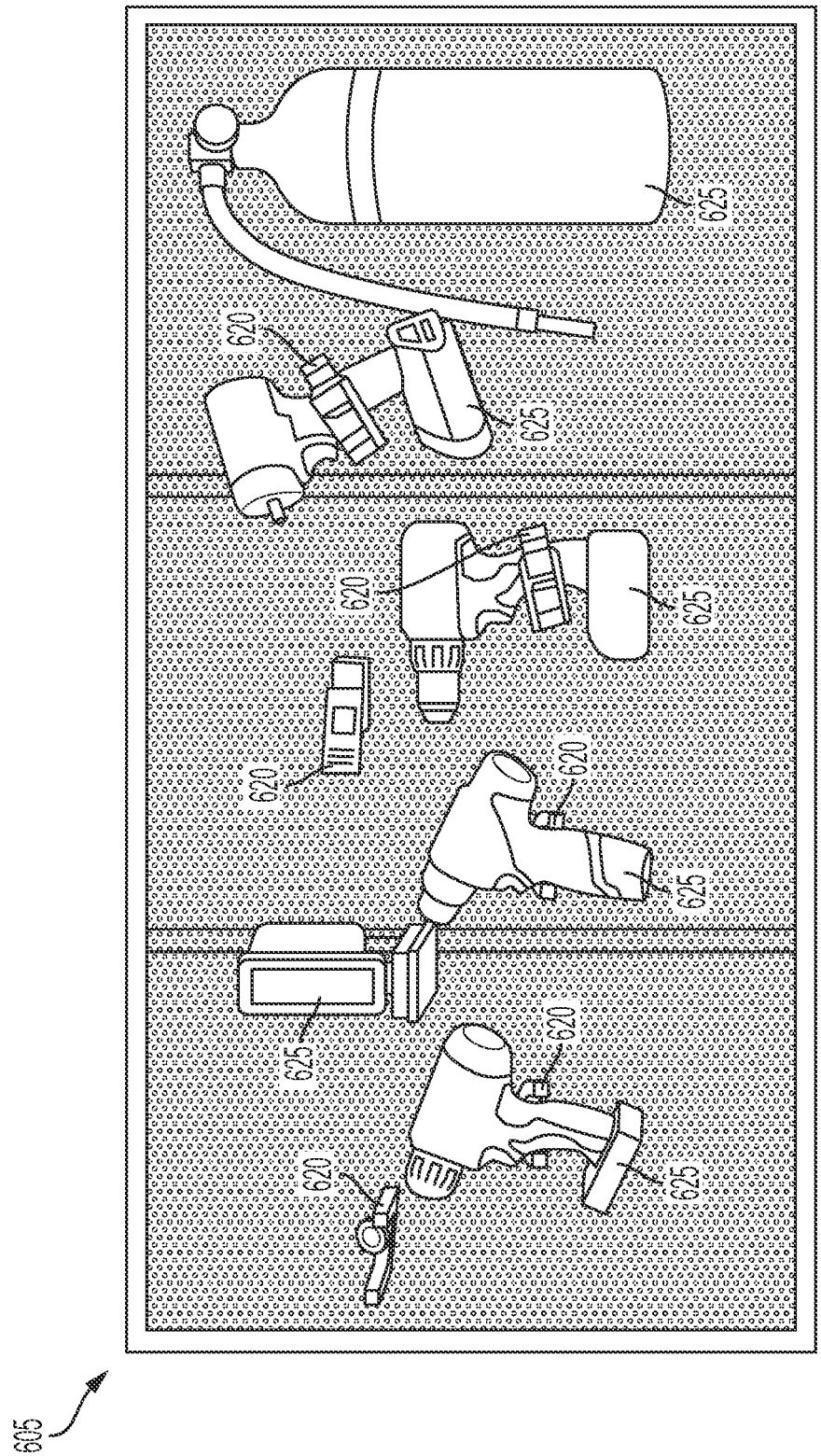
FIG. 6B depicts an example storage rack of a rear passenger storage area of a vehicle.
Figure 7:
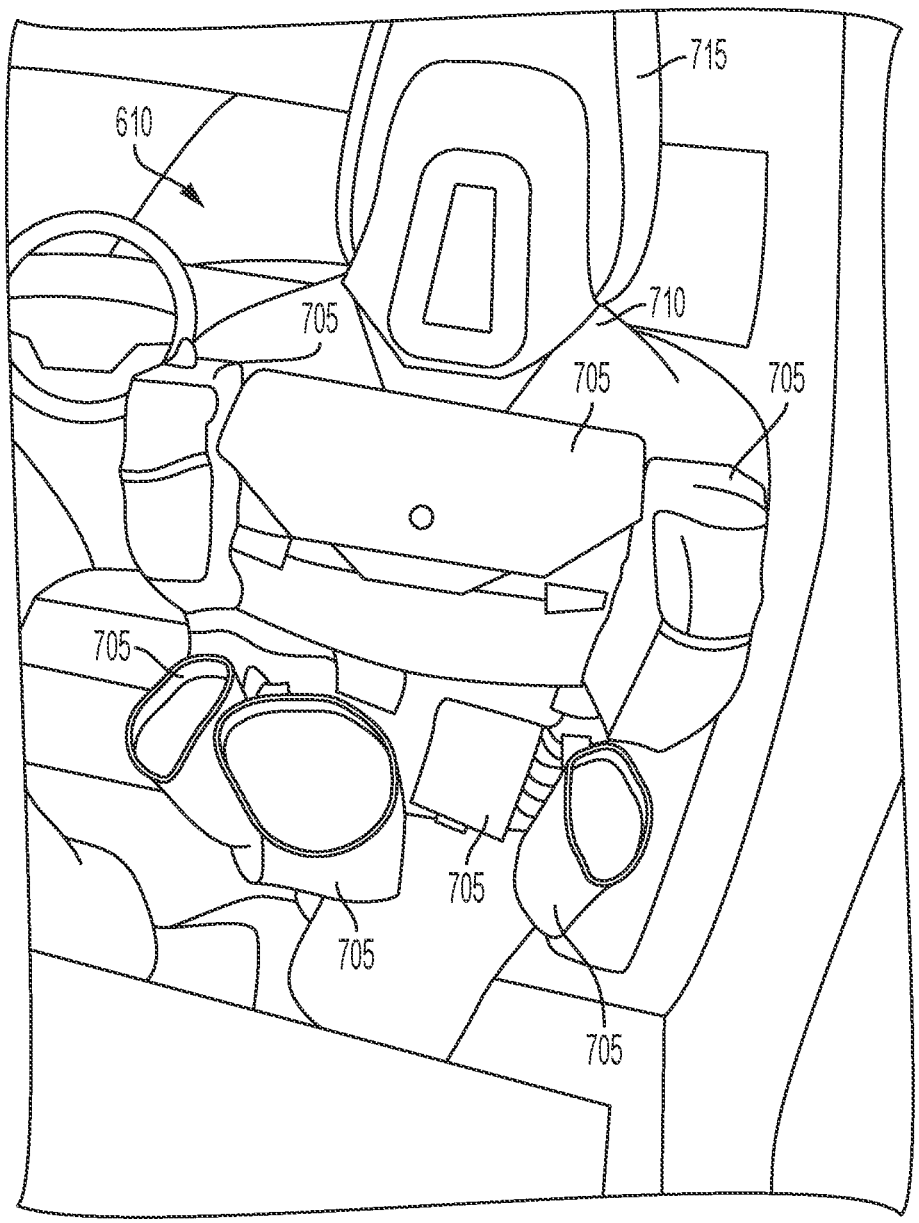
FIG. 7 depicts an example of a bag set mounted to a chair of a vehicle.

FIGS. 6A-7, among others, depict an example of the rear passenger storage area 200. The rear passenger storage area 200 can include at least one rack 605. The rack 605 can be located on a back wall of the rear passenger storage area 200. The rack 605 can be a metal or plastic material. The rack 605 can be perforated. The rack 605 can include holes. The rack 605 can be a peg board. The rack 605 can include a mesh pattern. The rack 605 can include at least one apparatus or component, such as hook or holding mechanism 620 for fixing equipment to the rack 605. The hook or holding mechanism 620 can mount to at least one hole in the rack 605. The hooks or holding mechanisms 620 can be inserted into the holes of the rack 605. Pegs, hooks or holding mechanisms 620 can be held within at least one hole of the rack 605 and equipment can be fixed to the hook or holding mechanism 620. The rack 605 can hold at least one tool or piece of equipment 625. The tools or pieces of equipment 625 can include at least one fire extinguisher, drills, batteries, flashlights, workspace lights, impact wrenches. A layer 615 of sound insulating material can be disposed between the rack 605 and the gear tunnel 170. If equipment or components rattle within the gear tunnel 170, the layer 615 can prevent or dampen the sound. This can allow a driver or passenger of the vehicle 105 with a quieter ride. The layer 615 can be a foam layer, a fiberglass layer, a vinyl sound barrier.

The rear passenger storage area 200 can include at least one seat cover 610. The seat cover 610 can include at least one bag or bag-set 705 for storing equipment. The cover 610 can be fixed to a back side of a passenger or driver chair. For example, the cover 610 can include an opening 710. The opening 710 can be placed over a headrest 715 of a seat. The opening 710 can secure the cover 610 to the seat and support or suspend the bags 705 over the back-side of the seat. The cover 610 can include a strap, belt, or cord that can be fixed around the headrest 715 of the seat. The cover 610 can be a flexible material that hangs over a top portion of the passenger or driver chair supporting the at least one bag.

Figure 8:
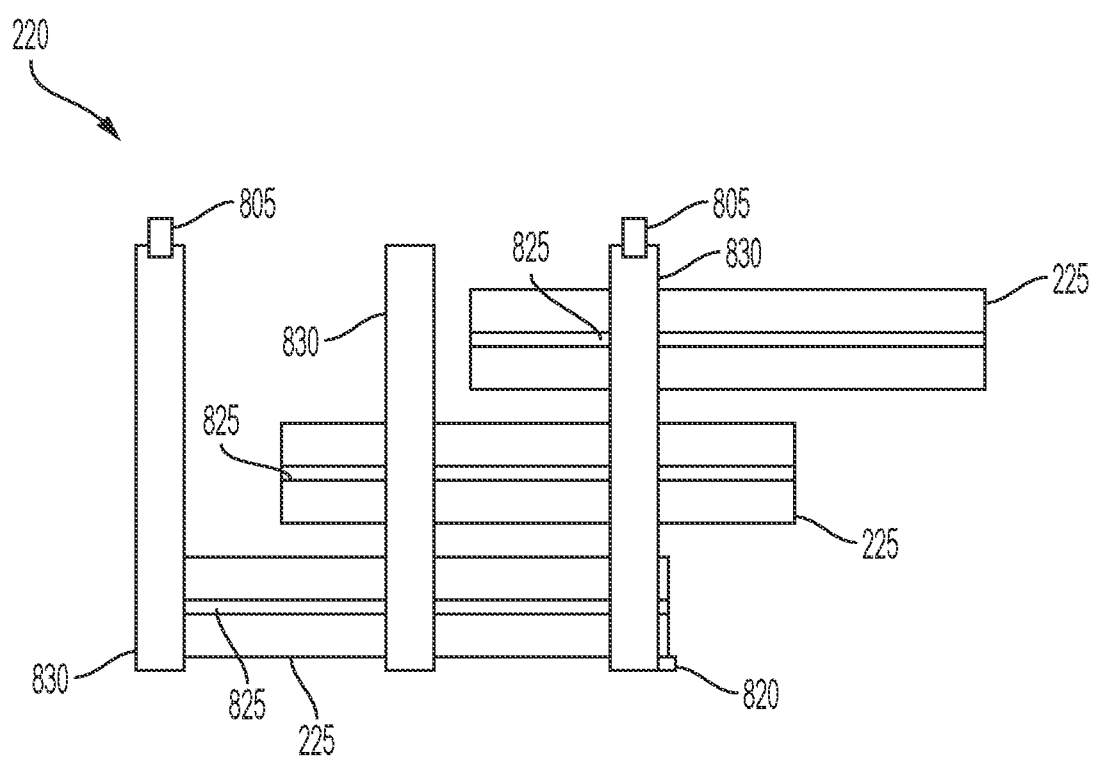
FIG. 8 depicts an example drawer unit.

FIG. 8 depicts an example drawer unit 220. The drawer unit 220 is depicted from a side view. At least one drawer unit 220, or at least a portion of the drawer unit 220, can be disposed or installed within the gear tunnel 170. For example, a first drawer unit 220 can be installed on a driver side of the gear tunnel 170. A second drawer unit 220 can be installed on a passenger side of the gear tunnel 170. The drawer units 220 can be disposed on opposite sides of the vehicle 105. The drawer units 220 can be stored directly opposite each other, e.g., end to end pointing in either direction. The drawer units 220 can be offset from each other, e.g., in different gear tunnels 170. A single drawer unit 220 can be installed in the tunnel 170 that includes drawers 225 that can extend out of a first opening on a first side of the vehicle 105 and out of a second opening on a second side of the vehicle 105.

The drawer unit 220 can include the drawers 225. The drawer unit 220 can include any number of drawers, e.g., one, two, three, or more. The drawer unit 220 can include one bottom drawer. The drawer unit 220 can include one bottom drawer 225 and one top drawer 225. The drawer unit 220 can include one bottom drawer 225 and one middle drawer 225. The drawers 225 can ride on tracks of the drawer unit 220. The tracks can include rolling mechanisms or sliding mechanisms that allow the drawers 225 to extend or retract.

The drawer unit 220 can include at least one portion, member, apparatus or support 830. The supports 830 can form an oval shape, an o-shape, a rectangle, a u-shape, a rectangular shape, or any other shape. The supports 830 can include bottom sides that extend across a bottom of the drawers 225. The supports 830 can include lateral sides that extend up from the bottom of the support 830 across lateral sides of the drawers 225 up to a top portion of the support 830. The top of the support 830 can extend from one lateral side of the support 830 to another lateral side of the support 830. The top of the support 830 can extend over tops of the drawers 225. The supports 830 can form a frame or base of the drawer unit 220.

The top drawer 225 can have dimensions 750-790 mm long. The top drawer 225 can be 700-820 mm long. The top drawer 225 can be less than 700 mm long. The top drawer 225 can be greater than 820 mm long. The top drawer 225 can be 220-250 mm wide. The top drawer 225 can be 200-270 mm wide. The top drawer 225 can be less than 200 mm wide. The top drawer 225 can be greater than 270 mm wide. The top drawer 225 can be 80-100 mm deep. The top drawer 225 can be 50-120 mm deep. The top drawer 225 can be less than 50 mm deep. The top drawer 225 can be greater than 120 mm deep. The top drawer 225 can be included in the gear tunnel 170 on a passenger side or a driver side of the vehicle.

The middle drawer 225 can have dimensions 750-790 mm long. The middle drawer 225 can be 700-820 mm long. The middle drawer 225 can be less than 700 mm long. The middle drawer 225 can be greater than 820 mm long. The middle drawer 225 can be 250-310 mm wide. The middle drawer 225 can be 200-350 mm wide. The middle drawer 225 can be less than 200 mm wide. The middle drawer 225 can be greater than 350 mm wide. The middle drawer 225 can be 90-120 mm deep. The middle drawer can be 80-130 mm deep. The middle drawer 225 can be less than 80 mm deep. The middle drawer 225 can be greater than 130 mm deep. The middle drawer 225 may be included on the passenger side but not the driver side, on the driver side but not the passenger side, or on both the passenger side and the driver side. The middle drawer 225 can be removed or excluded when the bottom drawer 225 holds tall equipment, e.g., a vehicle jack.

The bottom drawer 225 can have dimensions 750-790 mm long. The bottom drawer 225 can be 700-820 mm long. The bottom drawer 225 can be less than 700 mm long. The bottom drawer 225 can be greater than 820 mm long. The bottom drawer 225 can be 320-350 mm wide. The bottom drawer 225 can be 300-390 mm wide. The bottom drawer 225 can be less than 300 mm wide. The bottom drawer 225 can be greater than 390 mm wide. The bottom drawer 225 can be 100-140 mm deep. The bottom drawer 225 can be 80-160 mm deep. The bottom drawer 225 can be less than 80 mm deep. The bottom drawer 225 can be greater than 160 mm deep.

The bottom drawer 225 can be included on the passenger side or the driver side. The bottom drawer 225 can be a jack drawer for holding a jack. The jack drawer 225 can have dimensions of 750-790 mm long. The jack drawer 225 can be 720-725 mm long. The jack drawer 225 can be less than 720 mm long. The jack drawer 225 can be greater than 790 mm long. The jack drawer can be 320-340 mm wide. The jack drawer 225 can be 300-360 mm wide. The jack drawer 225 can be less than 300 mm wide. The jack drawer 225 can be greater than 360 mm wide. The jack drawer 225 can be 80-100 mm deep. The jack drawer 225 can be 50-150 mm deep. The jack drawer 225 can be less than 50 mm deep. The jack drawer 225 can be greater than 150 mm deep. This can provide the appropriate clearance for the jack.

The drawers 225 can include bottom sections, two lateral walls, a front section, and a rear section. The drawers 225 can be staggered. The drawers 225 can be staggered to fit within a slanted opening, an irregular opening, an asymmetric opening, or a symmetric opening) of the gear tunnel 170. The drawers 225 can be staggered and be different sizes to allow the drawers 225 to better package into the somewhat irregular shape of the gear tunnel 170 and the opening of the gear tunnel 170. The drawers 225 can have the same amount of depth and extend the same length out of the gear tunnel 170

At least one lateral wall of the bottom drawer 225 can be offset from at least one lateral wall of the top drawer 225. At least one lateral wall of the bottom drawer 225 can be offset from the lateral walls of the top drawer 225 and the middle drawer 225. For example, a left wall of the bottom drawer 225 or middle drawer 225 can be offset a distance to the right from the left wall of the top drawer 225. A right wall of the bottom drawer 225 or the middle drawer 225 can be offset a distance to the right from the right wall of the top drawer 225. A left wall of the middle drawer 225 can be offset a distance to the left from a left wall of the bottom drawer 225. A left wall of the top drawer 225 can be offset a distance to the left from a left wall of the middle drawer 225. A right wall of the middle drawer 225 can be offset a distance to the left from a right wall of the bottom drawer 225. A right wall of the top drawer 225 can be offset a distance to the left from a right wall of the middle drawer 225. A left wall of the bottom drawer 225 can be offset a distance to the right of the middle drawer 225. A right wall of the bottom drawer 225 can be offset a distance to the right of the middle drawer 225. A left wall of the middle drawer 225 can be offset a distance to the right of the top drawer 225. A right wall of the middle drawer 225 can be offset a distance to the right of the top drawer 225. The drawers 225 can extend or transport the same length or different lengths out of the drawer unit 220. The drawers 225 can be the same length, depth, width, or varying lengths, depths, or widths.

The drawer unit 220 can mount to an interior of the gear tunnel 170. For example, at least one locking mechanism 805, such as a tab, can clip onto a ceiling of the gear tunnel 170. A user can push the drawer unit 220 into the gear tunnel 170 and the tabs 805 can clip into receiving mechanisms of the gear tunnel 170 fastening the drawer unit 220 into the gear tunnel 170. Connectors such as screws, bolts, snaps can fix the support units 830 to a base of the gear tunnel 170, e.g., connector 820. The drawer unit 220 can be reconfigurable. For example, the drawer unit 220 can be installed on the passenger or driver side of the vehicle 105 or swapped from one side to the other. Furthermore, various different sized or numbers of drawers can be inserted into the drawer unit 220 or moved between drawer units 220. This can allow the drawer unit 220 to be customizable and reconfigurable.

The drawer unit 220 can include at least one member, track, slide, device, or rail 825. The rails 825 can transport the drawers 225, or a portion of the drawers 225, from a first location within the gear tunnel 170 and to a second location outside the gear tunnel 170. The rails 825 can include a portion, such as an outer portion, fixed to an inner side of the drawer unit 220. The rails 825 can include a portion, such as an inner portion, fixed to the drawers 225. The inner portion can ride on the outer portion allowing the drawers 225 to transport between extended and retracted locations. The inner portion and the outer portion can be swapped, e.g., the outer portion mounted on the drawers 225 and the inner portion fixed to the drawer unit 220. The rails 825 that the drawers extend on a can be mounted to a frame of the drawer unit 220 that sits inside the gear tunnel 170. The inner and outer portions can be telescoping or partially telescoping portions.

Figure 9A:
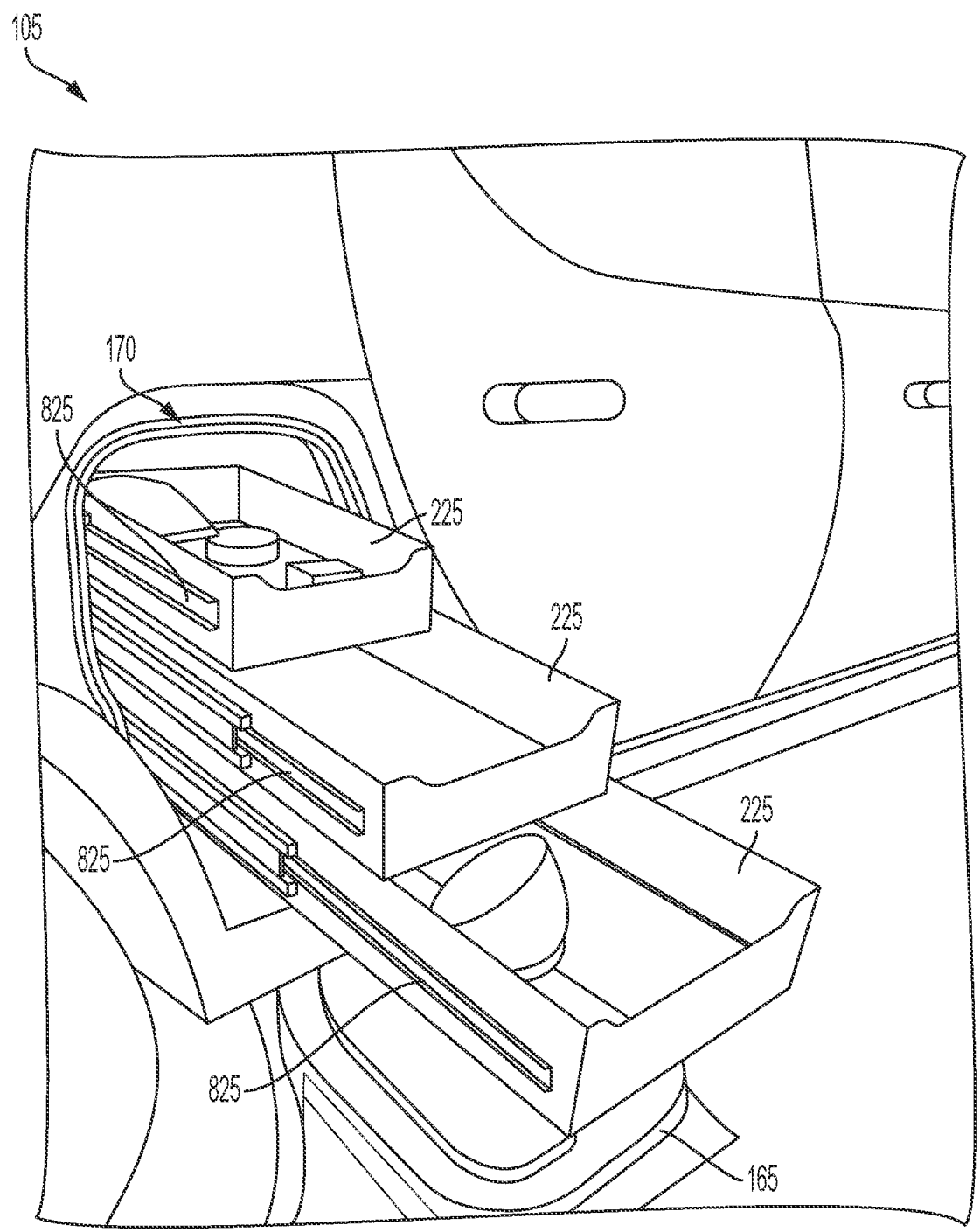
FIG. 9A depicts an example of the drawer unit installed in a gear tunnel on a passenger side of a vehicle.
Figure 9B:
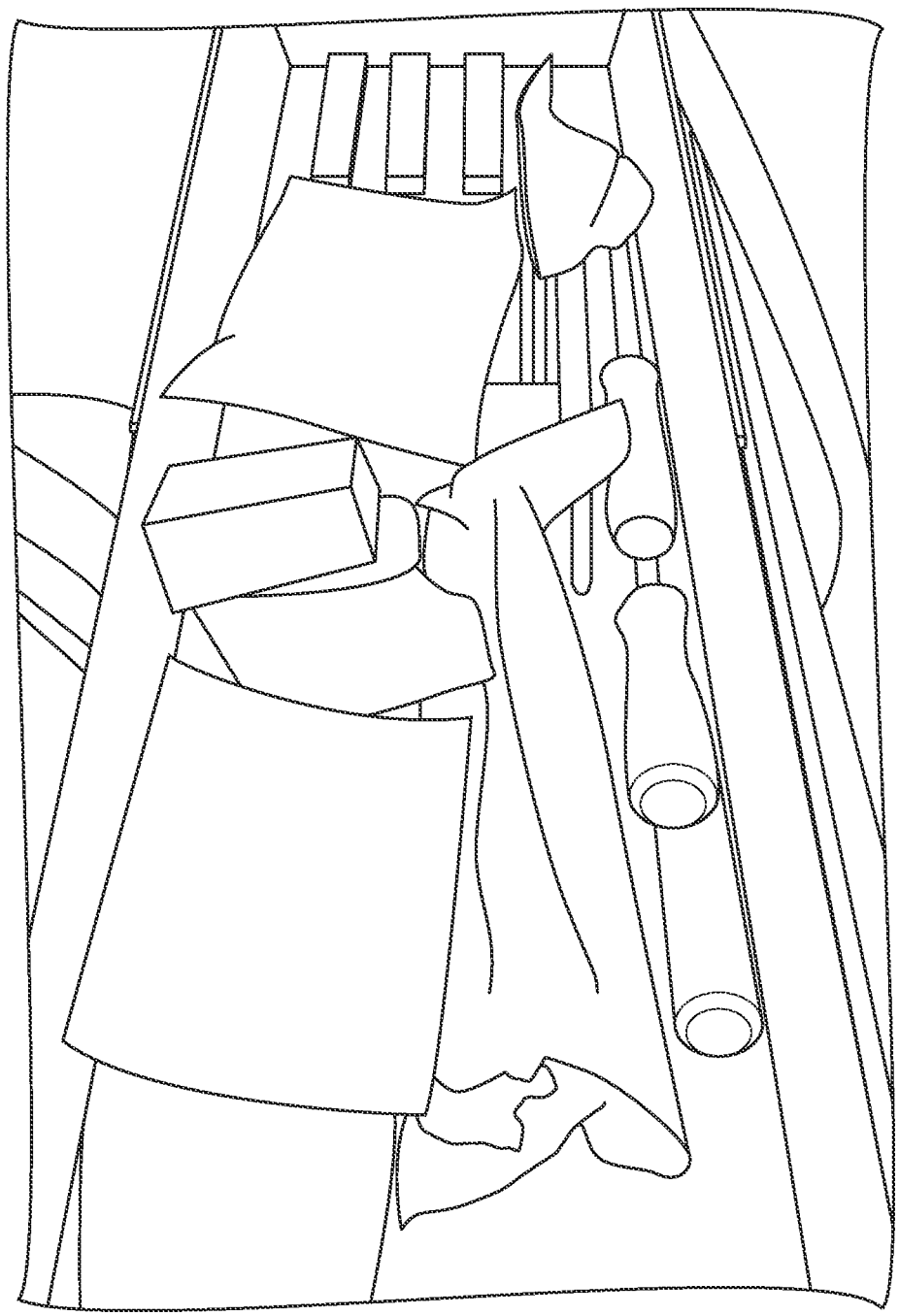
FIG. 9B depicts an example top drawer of a drawer unit installed in a gear tunnel on a passenger side of a vehicle.
Figure 9C:
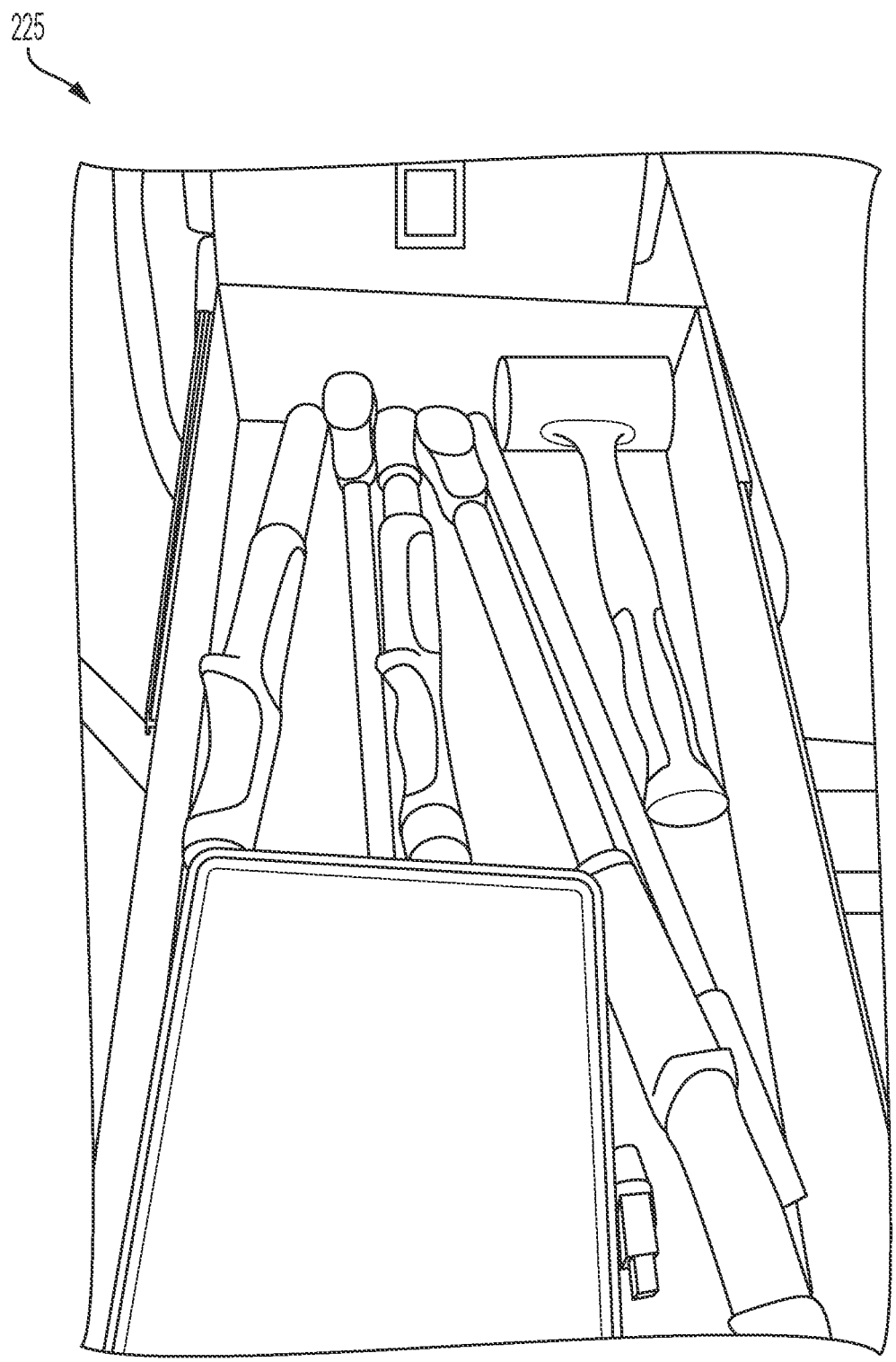
FIG. 9C depicts an example middle drawer of a drawer unit installed in a gear tunnel on a passenger side of a vehicle.
Figure 9D:
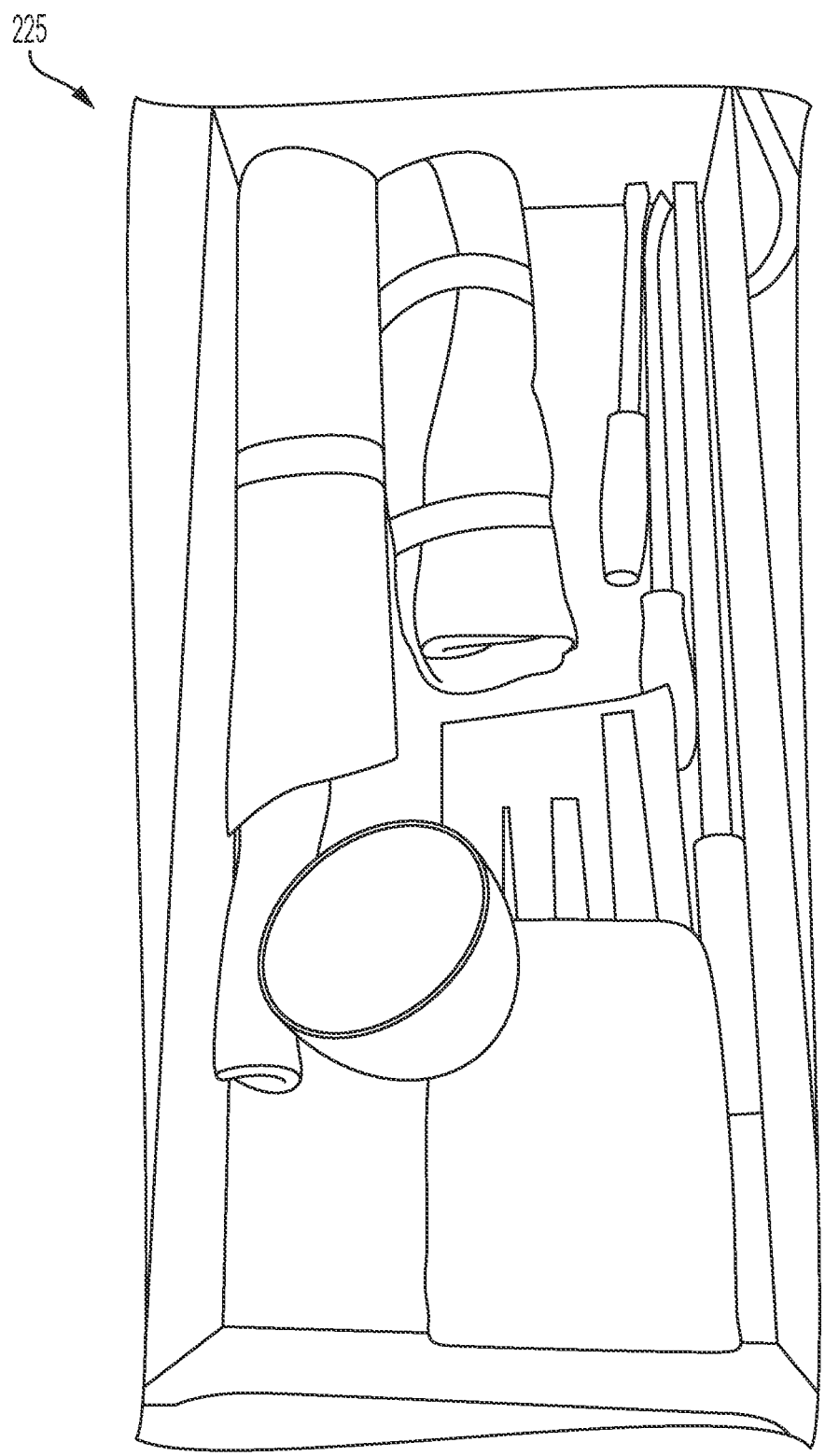
FIG. 9D depicts an example bottom drawer of a drawer unit installed in a gear tunnel on a passenger side of a vehicle.
Figure 10:
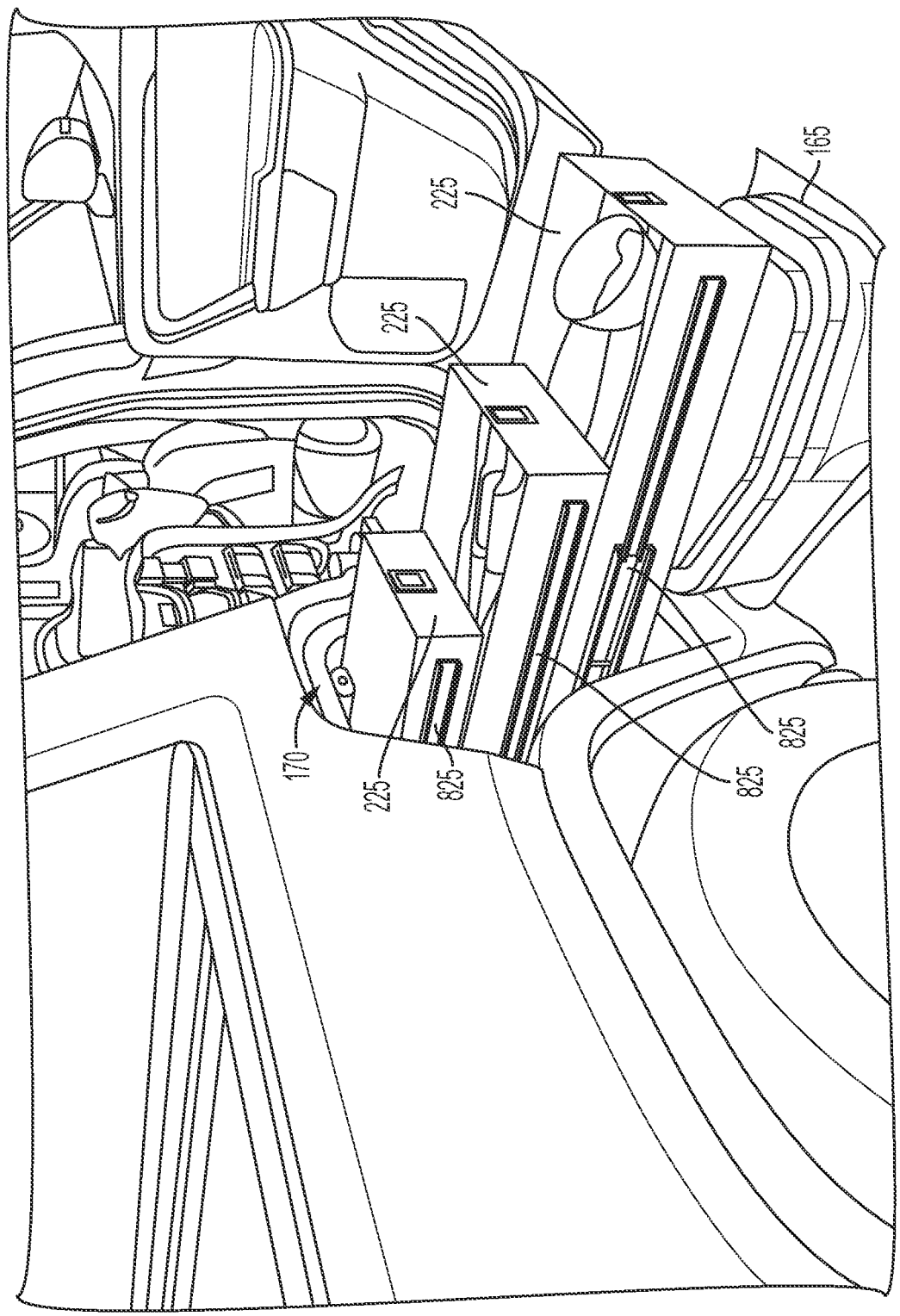
FIG. 10 depicts another example of a drawer unit installed in the gear tunnel on a passenger side of a vehicle.

FIGS. 9A-10 depict an example of the drawer unit 220 installed in the gear tunnel 170 on a passenger side of the vehicle 105. FIG. 9B depicts a top drawer 225. FIG. 9C depicts a middle drawer 225. FIG. 9D depicts a bottom drawer 225. The drawer unit 220 can be installed in the gear tunnel 170 on the passenger side of the vehicle 105. The drawers 225 can be extended to staggered lengths. The drawers 225 can each be different lengths. For example, the drawers 225 can be extended fully out of the tunnel 170 but be different lengths such that when the drawers 225 are fully extended, the drawers 225 are staggered. The drawers 225 can be the same length. The drawers 225 can be extended fully or partially out of the tunnel. The drawers 225 can be extended various distances out of the tunnel 170 to stagger the drawers 225. The top drawer 225 can extend out the least compared to the middle drawer 225 and the bottom drawer 225. The middle drawer 225 can extend out a distance a first percentage more than the top drawer 225 is extended out. The bottom drawer 225 can extend out a distance a second percentage more than the top drawer 225 or the middle drawer 225. The first percentage and the second percentage can be the same value. The first percentage and the second percentage can be different values. The percentages can be 5-10%, 3-20%, less than 3%, more than 20%.

Figure 11:
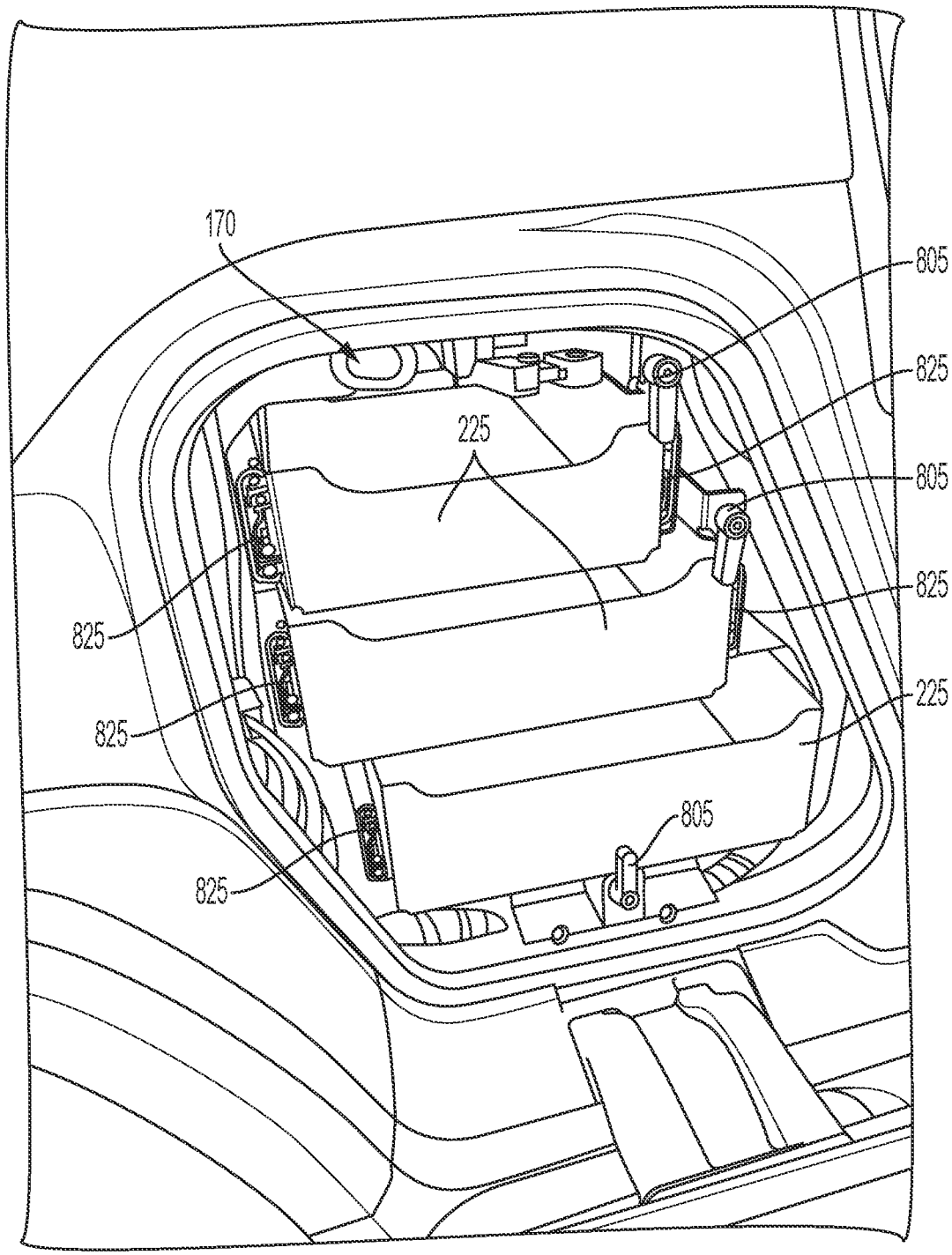
FIG. 11 depicts an example of drawers of a drawer unit retracted within a gear tunnel on a passenger side of a vehicle.

FIG. 11 depicts an example of the drawer unit 220 including drawers 225 retracted within the gear tunnel 170 on the passenger side of the vehicle 105. The drawer unit 220 can include at least one locking mechanism 805. The locking mechanisms 805 can be located above a center of the drawers 225, on a left side of the drawers 225, on a right side of the drawers 225, or on a bottom side of the drawers 225. The locking mechanisms 805 can hold the drawers 225 within the gear tunnel 170 when the drawers 225 are in a retracted position. The locking mechanisms 805 can be or include rotating latches. The rotating latch that holds the drawers 225 in a closed position or limit movement of the drawers 225 during driving. The drawers 225 can be mounted to brackets, such as adjustable brackets, that are attached to a fixed structure that supports the drawer rails and mounts them to the gear tunnel 170. The locking mechanisms 805 can be mounted to adjustable brackets that are attached to the drawer unit 220 that support rails 825 that the drawers 225 ride on. The drawer unit 220 can be fixed via one or more mounts at a top side of the gear tunnel 170, a side of the gear tunnel 170, or on the bottom of the gear tunnel 170.

Figure 12A:
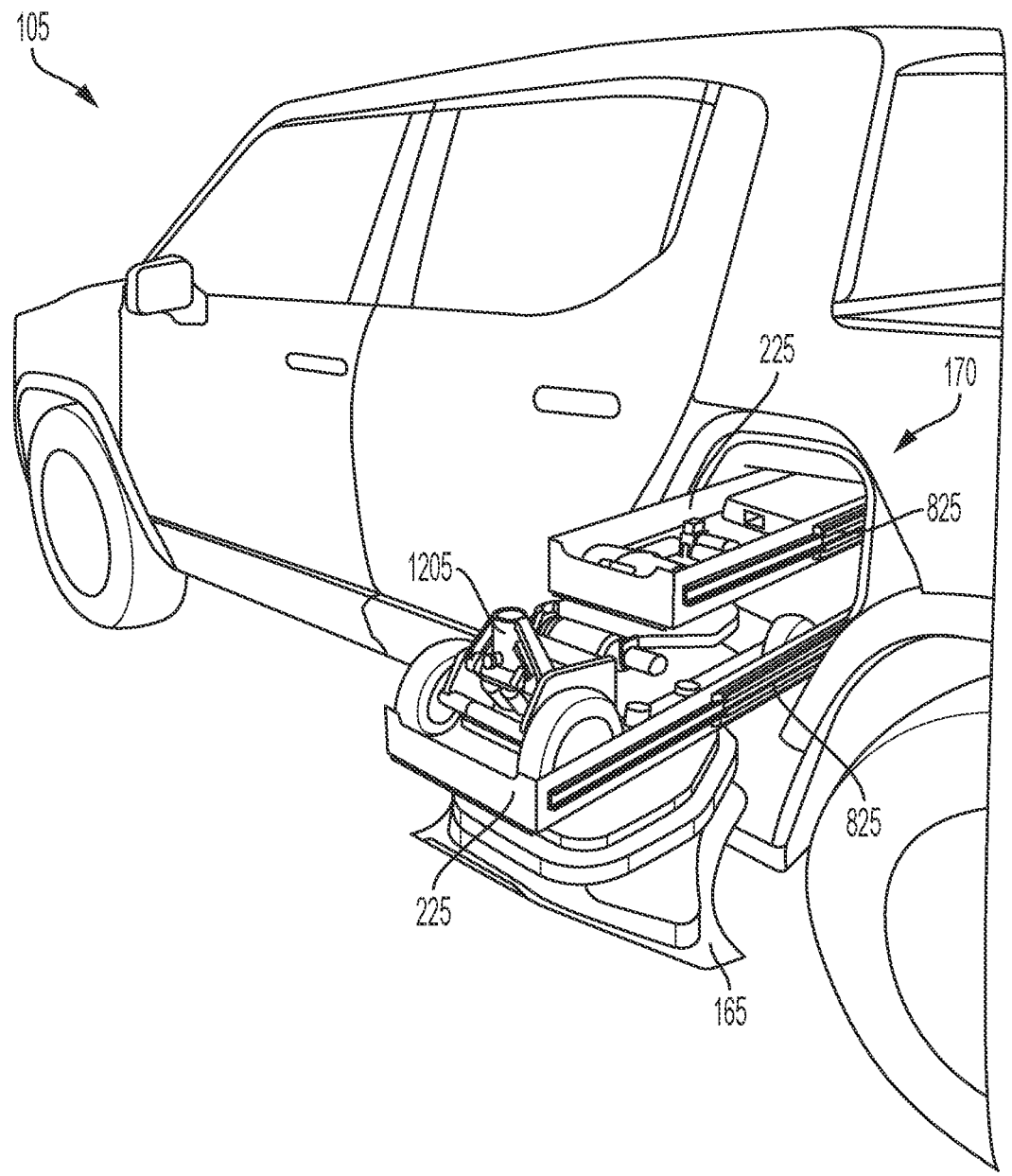
FIG. 12A depicts an example of a drawer unit including drawers installed in a gear tunnel on a driver side of a vehicle.
Figure 12B:
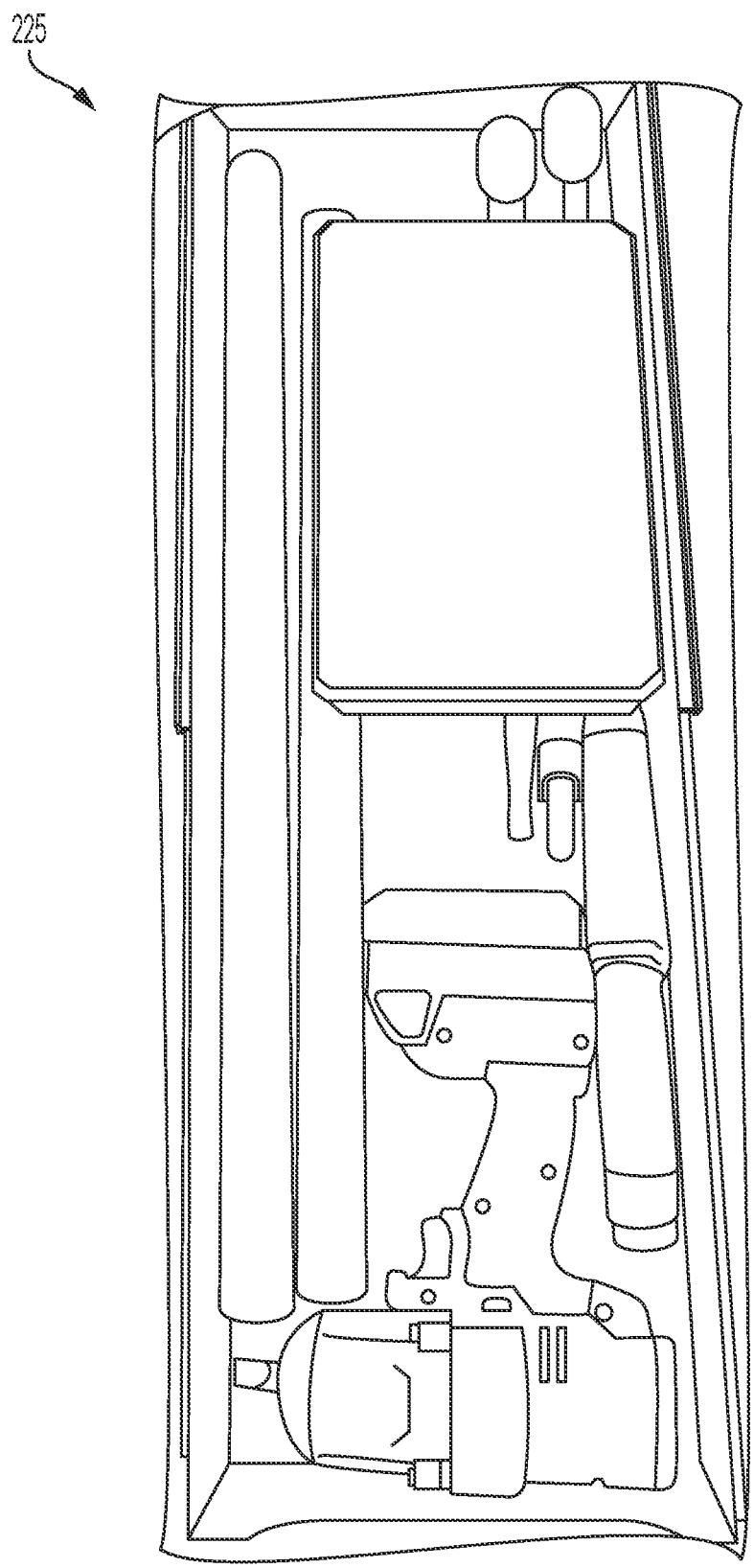
FIG. 12B depicts an example top drawer of a drawer unit installed in a gear tunnel on a driver side of a vehicle.
Figure 12C:
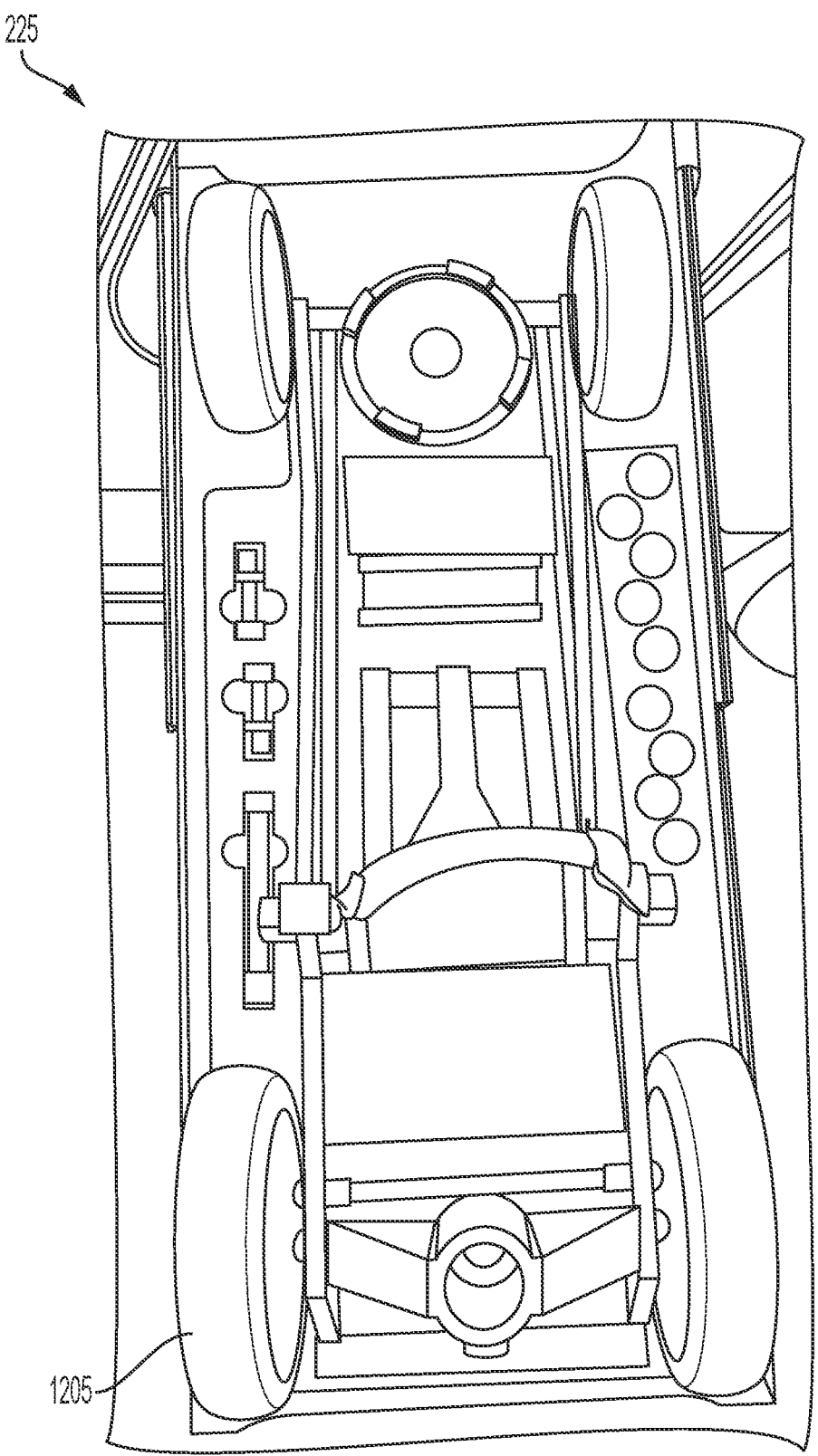
FIG. 12C depicts an example bottom drawer of a drawer unit installed in a gear tunnel on a driver side of a vehicle.

FIGS. 12A-13 depict an example of the drawer unit 220 installed in the gear tunnel 170 on a driver side of the vehicle 105. FIG. 12B depicts an example top drawer 225. FIG. 12C depicts an example bottom drawer 225. In FIG. 12A, the drawer unit 220 includes a bottom drawer 225 and a top drawer 225. The drawer unit 220 may not include a middle drawer 225 in order to make space for a jack 1170 stored in the bottom drawer 225. The drawers 225 can be removable. For example, the drawers 225 can be added or removed. A user can add or remove drawers 225 such that there is only one bottom drawer 225. A user can include only a single drawer 225 within the drawer unit 220 if the equipment, component, or tool carried in the bottom drawer is tall. A user can add or remove drawers 225 such that there is only a bottom drawer 225 and a top drawer 225. A user can include only a bottom drawer 225 and a top drawer 225 if the bottom drawer 225 stores equipment, components, or tools, that are tall but have a vertical height that is less than a distance from a top surface of the bottom drawer 225 to a bottom surface of the top drawer unit 225.

Figure 14:
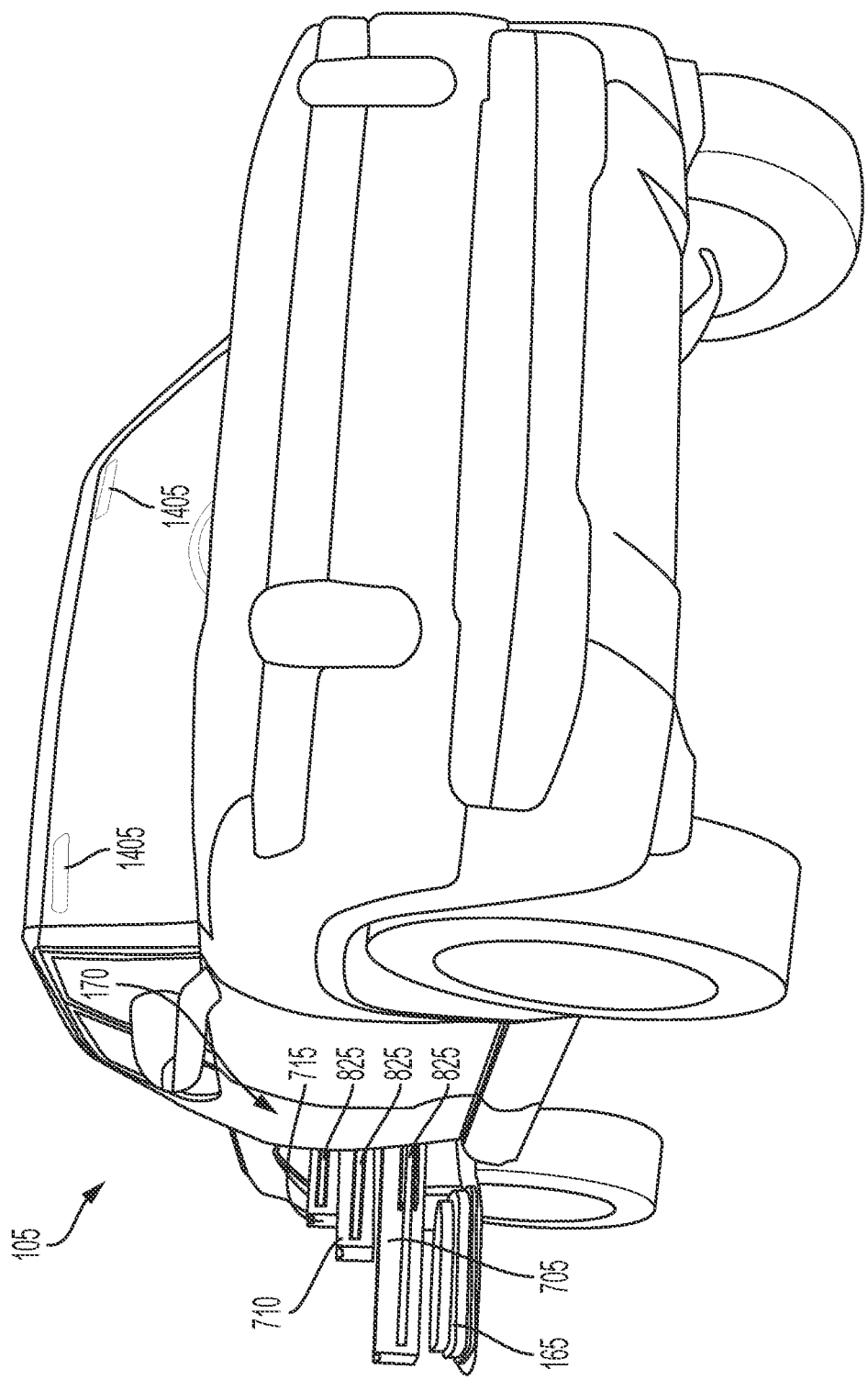
FIG. 14 depicts an example front view of the vehicle including a drawer unit installed in a gear tunnel on a passenger side of a vehicle and a front light.

FIG. 14 depicts an example front view of the vehicle 105 including the drawer unit 220 installed in the gear tunnel 170 on the passenger side of the vehicle and at least one front light 1405. The front lights 1405 can be strobe lights. The front lights 1405 can include at least one light emitting diode (LED), incandescent lamp, compact fluorescent lamp, halogen lamp, neon lamp. The front lights 1405 can be powered via a power source of the vehicle 105, e.g., the battery pack 110. An input device 520, such as a switch or button can cause the front lights 1405 to turn on, turn off, flash, stay on constantly, be a particular color (e.g., yellow, white, green). The input device 520 of the panel 505 can control the front lights 1405. For example, a user can provide an input via the panel 505 and a system (e.g., electrical or computing system) of the vehicle 105 can control the front lights 1405 based on the command.

Figure 15:
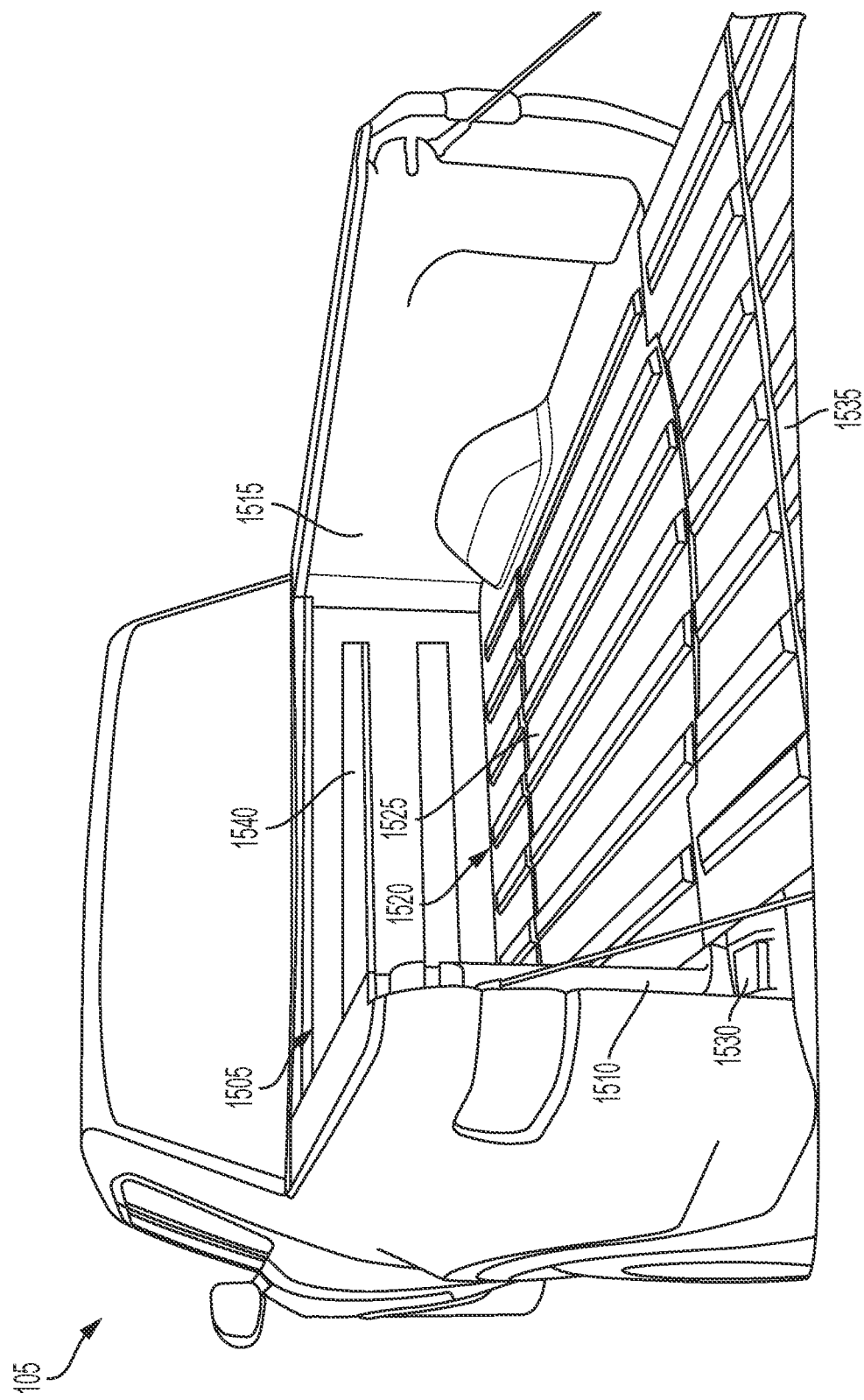
FIG. 15 depicts an example cargo bed of the vehicle including a storage compartment.

FIG. 15 depicts an example cargo bed 175 of the vehicle 105 including a storage compartment. The cargo bed 175 can include a back side 1540, a first lateral side 1510, a second lateral side 1515, a tailgate 1535, and a bottom portion 1520. The cargo bed 175 can store and secure components when the tailgate 1535 is in an up position. The cargo bed 175 can provide access to the components when the tailgate 1535 is in a down position. The vehicle 105 can include at least one input device 1530. The input device 1530 can be a mechanical or electrical switch or push button that causes a storage compartment of the cargo bed 175 to be exposed or to be covered.

Figure 16:
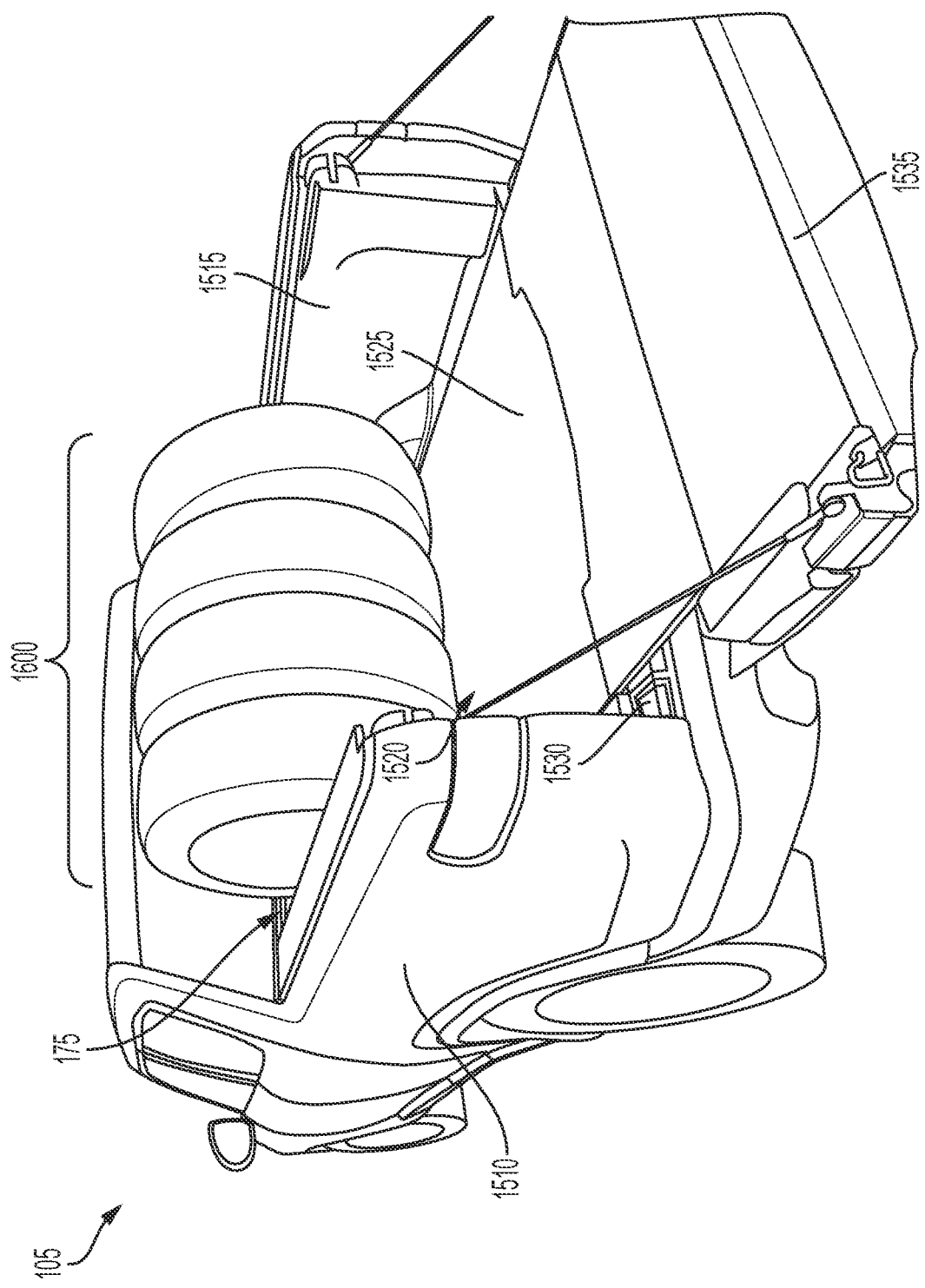
FIG. 16 depicts an example cargo bed of a vehicle storing tires.

For example, a portion 1525 of the bottom portion 1520 can open responsive to an input via the input device 1530 exposing the storage compartment. A mechanism can spring load or piston load the portion 1525 and lock the portion 1525 into a closed position. Responsive to the input device 1530 being interacted with, a holding or latching mechanism of the mechanism can release the spring or piston allowing the spring or piston to actuate (e.g., push) the portion 1525 up to expose the storage compartment. The portion 1525 can hinge on one or multiple sides. The portion 1525 can unlock responsive to the input device 1530 being interacted with and a user can remove the portion 1525 to expose the storage compartment. The storage compartment can be structured to store tires (e.g., spare tires), equipment, jacks, jack stands, or other components. FIG. 16 depicts another example of the cargo bed 175 holding at least one tire 1600. In FIG. 16, the storage compartment is closed. The storage compartment can include at least one drawer. The drawers can be stacked on top of each other. The drawers can be lined next to each other. A drawer can be configured to store a vehicle tire (e.g., a spare tire). Another drawer can store a component. The drawers can be moved, e.g., a drawer for the spare tire can be switched with the drawer for the component.

Figure 17:
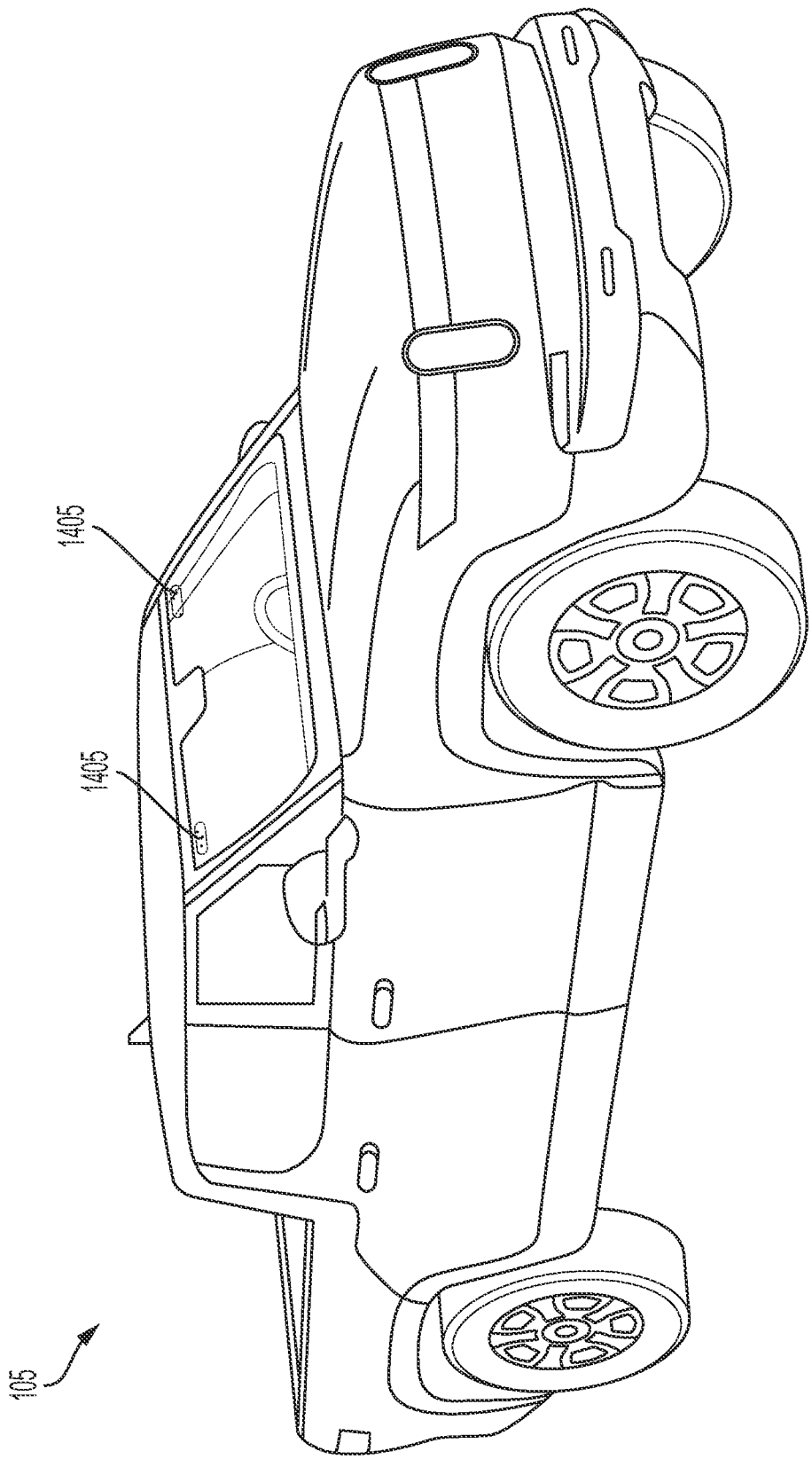
FIG. 17 depicts an example a the vehicle including front lights.
Figure 18:
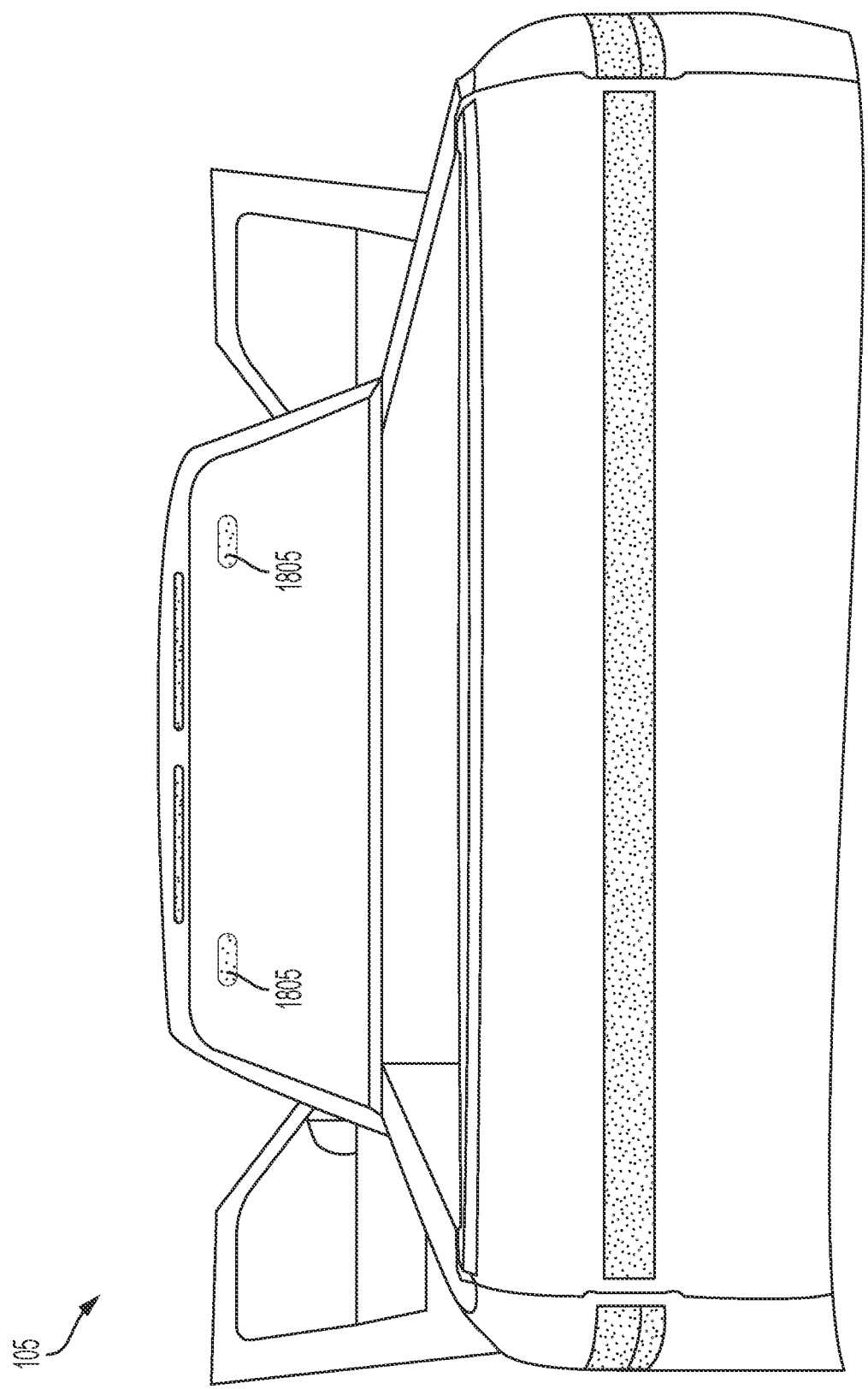
FIG. 18 depicts an example of a vehicle including rear lights.

FIG. 17 depicts an example of the vehicle 105 including the front lights 1405. FIG. 18 depicts an example of the vehicle 105 including at least one rear light 1805. The front lights 1405 or the rear lights 1805 can be strobe lights. The front lights 1405 or the rear lights 1805 can include at least one light emitting diode (LED), incandescent lamp, compact fluorescent lamp, halogen lamp, neon lamp. The front lights 1405 or the rear lights 1805 can be powered via a power source of the vehicle 105 (e.g., the battery pack 110).

The panel 505 can include an input device 520, such as a switch or button. The input device 520 can cause the front lights 1405 or the rear lights 1805 to turn on, turn off, flash, stay on constantly, be a particular color (e.g., yellow, white, green). At least one first input device 520 can control the front lights 1405. At least one second input device 520 can control the rear lights 1805. The panel 505 can control the rear lights 1805. For example, a user can provide an input via the panel 505 and a system of the vehicle 105 can control the rear lights 1805 based on the command.

Figure 19:
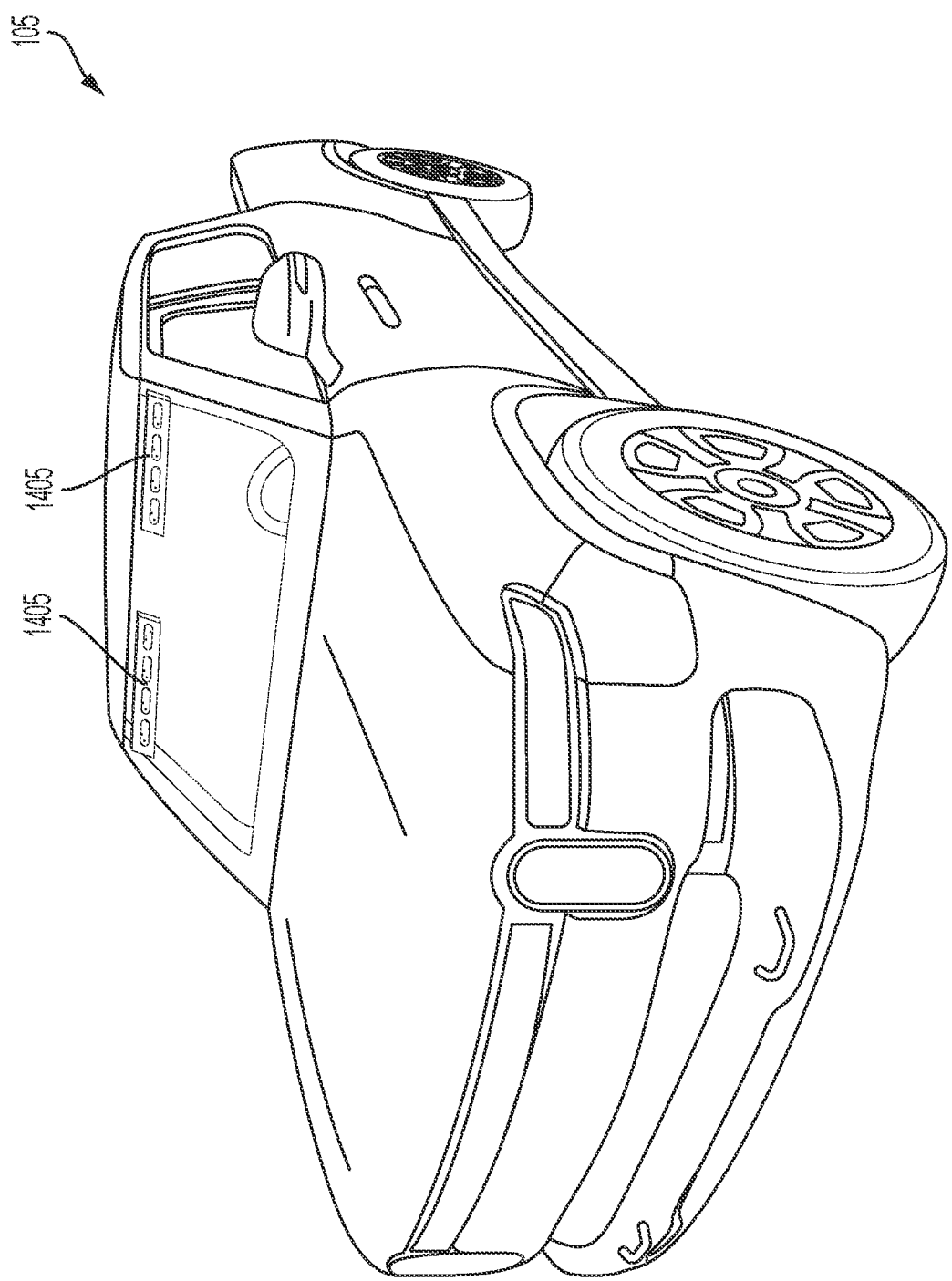
FIG. 19 depicts an example of a vehicle including multiple front lights.

FIG. 19 depicts an example of the vehicle 105 including multiple front lights 1405. The front lights 1405 can include two, three, four, or more lights. The lights can be various colors, such as white, yellow, or green for example. The front lights 1405 can flash on or off together or flash in a pattern. The pattern can be turning the front lights 1405 on or off inside to outside, turning the front lights 1405 on or off outside to inside, turning the two middle lights on followed by the two outer lights, turning the two outer lights on or off followed by the two outer lights. The vehicle 105 can include flashing yellow front lights 1405 to represent a service vehicle, a trail vehicle, a government vehicle, a camp site vehicle, a park ranger vehicle.

Figure 20:
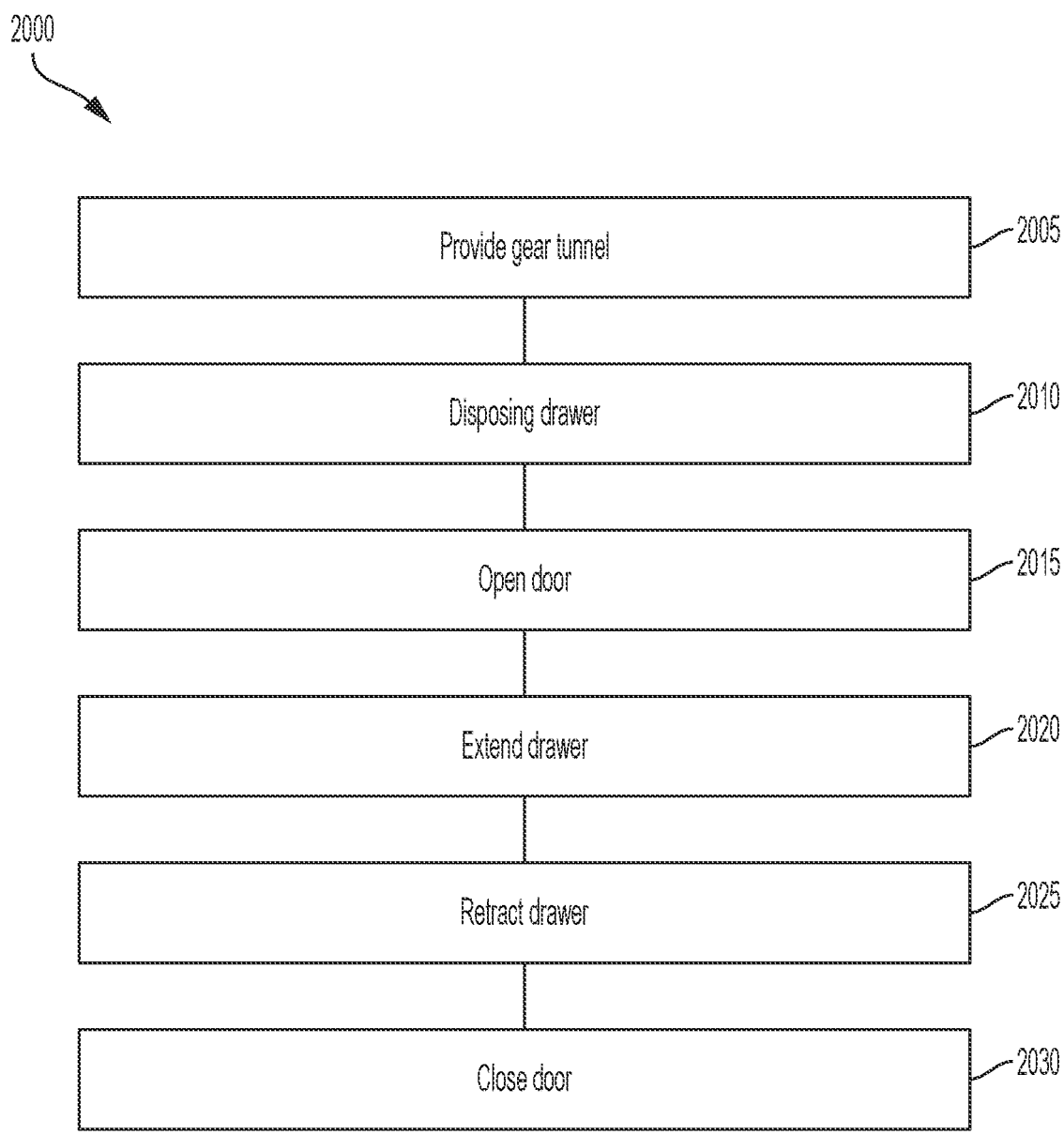
FIG. 20 depicts an example method of a gear tunnel.

FIG. 20 depicts an example method 2000 for a gear tunnel 170. At least one ACT of the method 2000 can be performed by the vehicle 105, at least one actuator (e.g., motors, springs, pistons, latches) of the vehicle 105, by a driver or passenger of the vehicle 105. The method 2000 can include an ACT 2005 of providing a gear tunnel. The method 2000 can include an ACT 2010 of disposing a drawer. The method 2000 can include an ACT 2015 of opening a door. The method 2000 can include an ACT 2020 of extending a drawer. The method 2000 can include an ACT 2025 of retracting a drawer. The method 2000 can include an ACT 2030 of closing the door.

At ACT 2005, the method 2000 can include providing the gear tunnel 170. The gear tunnel 170 can be a component of the vehicle 105. The gear tunnel 170 can be a tunnel into or through the vehicle 105. The gear tunnel 170 can include a top side, a bottom side, and lateral sides. The gear tunnel 170 can extend from a passenger side of the vehicle 105 into or through the vehicle 105 to a driver side of the vehicle 105. The gear tunnel 170 can extend into the vehicle 105 from a front-side of the vehicle 105 towards a front windshield of the vehicle 105.

At ACT 2010, the method 2000 can include disposing a drawer 225. Disposing the drawer 225 can include disposing one or multiple drawers 225 in the gear tunnel 170. Disposing the drawers 225 can include inserting a drawer unit 220 into the gear tunnel 170. The drawer unit 220 can be inserted into the gear tunnel 170 and fixed to an interior of the gear tunnel 170. For example, at least one support 830 of the gear tunnel 170 can be fixed to the interior of the gear tunnel 170. The supports 830 can include at least one locking mechanism 805. The locking mechanisms 805 can fix to an interior receiving portion of the gear tunnel 170. The supports 830 can be fixed to the interior of the gear tunnel 170 via snaps, connectors, screws, bolts, nuts, or other components. The drawers 225 can be inserted into the drawer unit 220 before the drawer unit 220 is inserted into the gear tunnel 170 or after the drawer unit 220 is inserted into the gear tunnel 170.

At ACT 2015, the method 2000 can include opening the door 165. Opening the door 165 can include opening one door 165 on one side of the gear tunnel 170 or opening a door on either end of the gear tunnel 170. The door 165 can cover and seal an opening of the gear tunnel 170. The door 165 can hinge on a hinging member from a vertical position covering the opening of the gear tunnel 170 to a horizontal position exposing the opening of the gear tunnel 170. The door 165 can open via gravity, a user pulling on the door 165, a motor that actuates the door 165, a spring that actuates the door 165, a piston that actuates the door 165.

At ACT 2020, the method 2000 can include extending the drawer 225. Extending the drawer 225 can include transporting at least a portion of the drawer 225 from a position inside the gear tunnel 170 to a position outside the gear tunnel 170. For example, a user can pull on the drawer 225 to extract the drawer 225 from within the gear tunnel 170 to extend out of the gear tunnel 170. A motor, spring, or compressed piston can extend the drawer 225.

At ACT 2025, the method 2000 can include retracting the drawer 225. Retracting the drawer 225 can include transporting at least a portion of the drawer 225 from a positon outside the gear tunnel 170 into the gear tunnel 170. For example, a user can push on the drawer 225 to retract the drawer 225 into the gear tunnel 170. A motor, spring, or compressed piston can retract the drawer 225 into the gear tunnel 170.

At ACT 2030, the method 2000 can include closing the door 165. The door 165 can hinge on a hinging component of the vehicle 105 from an open position where the opening of the gear tunnel 170 is exposed to a position covering or sealing the opening of the gear tunnel 170. The door 165 can lock to secure the door 165 over the opening of the gear tunnel 170. The door 165 can close responsive to a user pushing the door 165. A piston, spring, or motor can further close the door 165.

Figure 21:
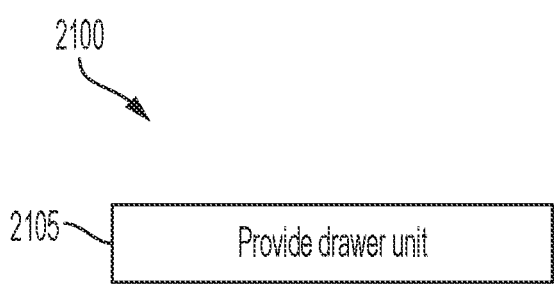
FIG. 21 depicts an example method of providing a drawer unit.

FIG. 21 depicts an example method 2100 of providing a drawer unit 220. The method 2100 can include an ACT 2105 of providing a drawer unit. The ACT 2105 can include providing a drawer unit 220. The drawer unit 220 can be disposed within the gear tunnel 170. A first drawer unit 220 can be inserted into the gear tunnel 170 through a first opening of the gear tunnel 170 and a second drawer unit 220 can be inserted into the gear tunnel 170 through a second opening of the gear tunnel 170 on an opposite side of the gear tunnel 170.

The drawer unit 220 can include support members 830. The support members 830 can be fixed to an interior of the gear tunnel 170. The drawer unit 220 can be secured within the gear tunnel 170 and at least one fastener, connector, bolt, screw, or nut can limit motion of the drawer unit 220 within the gear tunnel 170. The support members 830 can include at least one rail 825. For example, on a first side of the drawers 225, the drawer unit 220 can include at least one first rail. On a second side of the drawers 225, the drawer unit 220 can include at least one second rail. A first portion of the rails 825 can be fixed to the support members 830. A second portion of the rails 825 can be fixed to the drawers 225. The first and second portions of the rails 825 can slide with each other or telescope with each other. The drawers 225 can be inserted into the drawer unit 220. At least a portion of the drawers 225 can be transported or extended out of the drawer unit on the rails 825. The portion of the drawers 225 can be transported or extended out of the gear tunnel 170 through an opening of the gear tunnel 170. At least a portion of the drawers 225 can be retracted or transported back into the drawer unit 225. The portion of the drawers 225 can be retracted or transported back through the opening of the gear tunnel 170.

Figure 22:
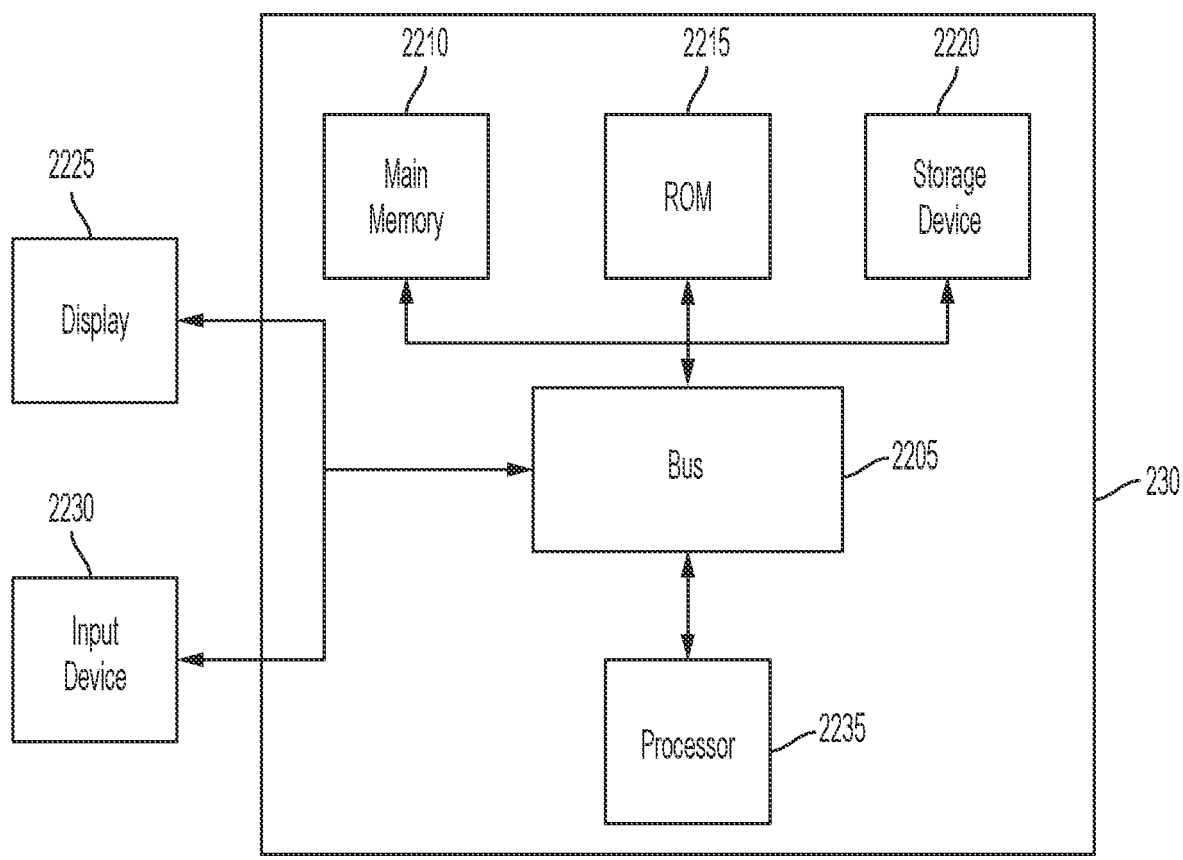
FIG. 22 is a block diagram depicting an architecture for a computer system that can be employed to implement elements of the systems and methods described and illustrated herein.

FIG. 22 depicts an example block diagram of a data processing system 230. The data processing system 230 can be a data processing system 230 of the vehicle 105. The data processing system 230 can be a data processing system of the battery pack 110. The data processing system 230 can be a component of a vehicle, a component of a smartphone, a component of a tablet, a component of a laptop computer.

The data processing system 230 can include or be used to implement a data processing system or its components. The data processing system 230 can include at least one bus 2205 or other communication component for communicating information and at least one processor 2235 or processing circuit coupled to the bus 2205 for processing information. The data processing system 230 can include one or more processors 2235 or processing circuits coupled to the bus 3605 for processing information. The data processing system 230 can include at least one main memory 2210, such as a random access memory (RAM) or other dynamic storage device, coupled to the bus 2205 for storing information, and instructions to be executed by the processor 2235. The main memory 2210 can be used for storing information during execution of instructions by the processor 2235. The data processing system 230 can further include at least one read only memory (ROM) 2215 or other static storage device coupled to the bus 2205 for storing static information and instructions for the processor 2235. A storage device 2220, such as a solid state device, magnetic disk or optical disk, can be coupled to the bus 2205 to persistently store information and instructions.

The data processing system 230 can be coupled via the bus 2205 to a display 2225, such as a liquid crystal display, or active matrix display. The display 2225 can display information to a user such as a driver of the first vehicle 105 or other end user. An input device 2230, such as a keyboard or voice interface can be coupled to the bus 2205 for communicating information and commands to the processor 2235. The input device 2230 can include a touch screen of the display 2225. The input device 2230 can include a cursor control, such as a mouse, a trackball, or cursor direction keys, for communicating direction information and command selections to the processor 2235 and for controlling cursor movement on the display 2225.

The processes, systems and methods described herein can be implemented by the data processing system 2200 in response to the processor 2235 executing an arrangement of instructions contained in main memory 2210. Such instructions can be read into main memory 2210 from another computer-readable medium, such as the storage device 2220. Execution of the arrangement of instructions contained in main memory 2210 causes the data processing system 230 to perform the illustrative processes described herein. One or more processors in a multi-processing arrangement can be employed to execute the instructions contained in main memory 2210. Hard-wired circuitry can be used in place of or in combination with software instructions together with the systems and methods described herein. Systems and methods described herein are not limited to any specific combination of hardware circuitry and software.

Although an example computing system has been described in FIG. 36, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and '13' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the vehicles described herein can be various types of vehicles, e.g., internal combustion engine vehicles, hybrid vehicles, or electric vehicles. For example, the vehicles described herein and shown in the figures can be the same type of vehicle or different types of vehicles. For example, the systems and methods described herein can be implemented on internal combustion engine vehicles, hybrid vehicles, electric vehicles or various combinations thereof. The drawer unit can be fully detachable from the vehicle and be a portable drawer unit. For example, the drawer unit can be stored within the vehicle and completely removed from the vehicle for use. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A vehicle, comprising:
 a compartment comprising a door, the compartment comprising a bottom side and two lateral sides extending at oblique angles from the bottom side; and
 an apparatus disposed within the compartment, the apparatus comprising a first drawer and a second drawer movable from the compartment to extend over the door of the compartment, the first drawer stacked over the second drawer and offset from the second drawer.

2. The vehicle of claim 1, wherein the first drawer is configured to transport out of the compartment to provide access to a component stored by the first drawer.

3. The vehicle of claim 1, wherein the compartment is a tunnel located between an occupant seating area of the vehicle and a rear storage portion of the vehicle that extends from a first opening on a first side of the vehicle to a second opening on a second side of the vehicle;
 the vehicle comprising:
 the first drawer and the second drawer located on a first side of the tunnel;
 a third drawer located on a second side of the tunnel; and
 the first side of the tunnel and the second side of the tunnel are on opposite sides of the vehicle.

4. The vehicle of claim 1, comprising:
 the first drawer configured to store a vehicle jack, and at least a portion of the first drawer configured to transport out of the compartment on a driver side of the vehicle.

5. The vehicle of claim 1, comprising:
the first drawer to store a vehicle jack and configured to transport out of the compartment on a passenger side of the vehicle; and
a plurality of drawers including a top drawer, a middle drawer, and a bottom drawer, at least a portion of the top drawer, the middle drawer, and the bottom drawer configured to transport out of the compartment on a driver side of the vehicle.

6. The vehicle of claim 1, comprising:
the compartment positioned between a cargo bed of the vehicle and an occupant seating area of the vehicle.

7. The vehicle of claim 1, comprising:
the apparatus including a locking mechanism to secure the first drawer within the compartment with the first drawer stored within the compartment.

8. The vehicle of claim 1, comprising:
the apparatus comprising:
the first drawer comprising a first lateral wall and a second lateral wall; and
the second drawer disposed above the first drawer, the second drawer comprising a first lateral wall offset in a direction from the first lateral wall of the first drawer.

9. The vehicle of claim 1, comprising:
the apparatus comprising:
the first drawer comprising a first lateral wall and a second lateral wall; and
the second drawer disposed above the first drawer, the second drawer comprising a first lateral wall offset in a direction from the first lateral wall of the first drawer and a second lateral wall offset in the direction from the second lateral wall of the first drawer.

10. The vehicle of claim 1, comprising:
the apparatus comprising:
the first drawer including a width; and
the second drawer disposed above the first drawer, the second drawer including a width less than the width of the first drawer.

11. The vehicle of claim 1, comprising:
a shuttle disposed within the compartment to transport from a location within the compartment to a location outside the compartment through an opening of the compartment; and
the apparatus fixed to a top surface of the shuttle and configured to transport to and from the compartment with the shuttle carrying the first drawer and the second drawer.

12. The vehicle of claim 1, comprising:
a data processing system including one or more processors, coupled with memory to:
transmit at least one signal to at least one actuator of the vehicle to cause the at least one actuator to:
transport the door from a position covering an opening of the compartment to a position exposing the opening; and
transport at least a portion of the first drawer disposed within the compartment out of the compartment through the opening.

13. The vehicle of claim 1, wherein:
the two lateral sides extend at the oblique angles from the bottom side towards a rear of the vehicle;
the first drawer is offset from the second drawer towards the rear of the vehicle.

14. A method, comprising:
disposing a compartment in a vehicle, the compartment comprising a bottom side and two lateral sides extending at oblique angles from the bottom side;
disposing an apparatus within the compartment, the apparatus comprising a first drawer and a second drawer, the first drawer stacked over the second drawer and offset from the second drawer; and
opening the first drawer through transportation of the first drawer out of the compartment.

15. The method of claim 14, comprising:
securing, via a locking mechanism of the apparatus, the first drawer within the compartment with the first drawer stored within the compartment.

16. The method of claim 14, comprising:
disposing a shuttle within the compartment;
fixing the first drawer to a top surface of the shuttle; and
transporting the shuttle and the first drawer to a location outside the compartment through an opening in the compartment.

17. An apparatus, comprising:
a support configured to fit within a compartment of a vehicle comprising a bottom side and two lateral sides extending at oblique angles from the bottom side;
a first drawer connected to the support, the first drawer movable from the compartment to extend over a door of the compartment; and
a second drawer connected to the support, the second drawer movable from the compartment to extend over the door of the compartment, the first drawer stacked over the second drawer and offset from the second drawer.

18. The apparatus of claim 17, comprising:
the first drawer and the second drawer located on a first side of the compartment;
a third drawer located on a second side of the compartment; and
the first side of the compartment and the second side of the compartment on opposite sides of the vehicle.

19. The apparatus of claim 17, wherein:
the first drawer translates to and from the compartment.

20. The apparatus of claim 17, comprising:
a third drawer of a third width;
the first drawer of a first width greater than the third width, the first drawer located below the third drawer; and
the second drawer of a second width greater than the first width located below the first drawer.

21. The apparatus of claim 17, wherein:
the compartment is a tunnel located between an occupant seating area and a rear storage portion of the vehicle that extends from an opening on at least one side of the vehicle into the vehicle.

* * * * *